US012325008B2

(12) United States Patent
Da Palma et al.

(10) Patent No.: US 12,325,008 B2
(45) Date of Patent: Jun. 10, 2025

(54) MANUFACTURING APPARATUS, MIXING MACHINE AND/OR RECEIVING DEVICE FOR THE MANUFACTURE OF A COMPOSITION FROM A MIXTURE OF FORMULATIONS

(71) Applicants: Duolab International SARL, Plan-les-Ouates (CH); SEB S.A., Ecully (FR)

(72) Inventors: Franck Da Palma, La Talaudiere (FR); Pierre Durif, Monsteroux Milieu (FR); Jacky Chelle, Auberives-sur-Vareze (FR); Magali Millet, Les Mees (FR); Mélodie Perrin, Oraison (FR); Cécile Tourel, Aix en Provence (FR)

(73) Assignees: Duolab International SARL (CH); SEB S.A. (FR)

( * ) Notice: Subject to any disclaimer, the term of this patent is extended or adjusted under 35 U.S.C. 154(b) by 861 days.

(21) Appl. No.: 17/415,134

(22) PCT Filed: Dec. 20, 2019

(86) PCT No.: PCT/FR2019/053240
§ 371 (c)(1),
(2) Date: Jun. 17, 2021

(87) PCT Pub. No.: WO2020/128390
PCT Pub. Date: Jun. 25, 2020

(65) Prior Publication Data

US 2022/0054991 A1 Feb. 24, 2022

(30) Foreign Application Priority Data

Dec. 21, 2018 (FR) ...................................... 1873818

(51) Int. Cl.
*A45D 34/00* (2006.01)
*A45D 40/24* (2006.01)
(Continued)

(52) U.S. Cl.
CPC ............ *B01F 23/711* (2022.01); *A45D 40/24* (2013.01); *B01F 31/55* (2022.01); *B01F 31/70* (2022.01);
(Continued)

(58) Field of Classification Search
CPC ............... B65D 81/3261; B01F 35/513; B01F 2101/21; A45D 34/00; A45D 40/24
See application file for complete search history.

(56) References Cited

U.S. PATENT DOCUMENTS 2,798,488 A 7/1957 Hall
3,819,158 A 6/1974 Sharpe et al.
(Continued)

FOREIGN PATENT DOCUMENTS

CN 107126863 A 9/2017
CN 107649057 A 2/2018
(Continued)

OTHER PUBLICATIONS

Espacenet translation of Emmanuel Jalenques (FR2781685A1), published Feb. 4, 2000 (Year: 2000).*
(Continued)

*Primary Examiner* — Elizabeth Insler
(74) *Attorney, Agent, or Firm* — Lerner David LLP

(57) ABSTRACT

A mixing method using a manufacturing apparatus having a mixing machine having a support defining a receiving housing including a first and a second receiving locations configured to receive a first and a second deformable capsules, respectively, the first and second capsules configured to be fluidly linked and containing respectively a first and a second formulations,
(Continued)

an actuation system configured to transmit a pressure force to the first and second capsules to move the content of the first capsule in the second capsule, and vice versa, the mixing machine includes a heater element configured to heat at least one of the first and second capsules when received in the mixing machine, the method includes:

Heating and/or kneading having, alternately or simultaneously, setting in motion of the actuation system and heating by the heater element up to a target temperature; then cooling with kneading through setting in motion of the actuation system from which the kneading is stopped.

16 Claims, 19 Drawing Sheets

(51) Int. Cl.

| | |
|---|---|
| ***B01F 3/20*** | (2006.01) |
| ***B01F 11/00*** | (2006.01) |
| ***B01F 13/00*** | (2006.01) |
| ***B01F 15/00*** | (2006.01) |
| ***B01F 23/70*** | (2022.01) |
| ***B01F 31/00*** | (2022.01) |
| ***B01F 31/55*** | (2022.01) |
| ***B01F 33/501*** | (2022.01) |
| ***B01F 35/21*** | (2022.01) |
| ***B01F 35/32*** | (2022.01) |
| ***B01F 35/75*** | (2022.01) |
| ***B01F 35/92*** | (2022.01) |

(52) U.S. Cl.

CPC ...... *B01F 33/5011* (2022.01); *B01F 33/5014* (2022.01); *B01F 35/2115* (2022.01); *B01F 35/32025* (2022.01); *B01F 35/7546* (2022.01); *B01F 35/92* (2022.01); *A45D 2200/058* (2013.01)

(56) References Cited

U.S. PATENT DOCUMENTS

| | | | | |
|---|---|---|---|---|
| 3,830,475 | A | 8/1974 | Inoue et al. | |
| 3,880,408 | A | 4/1975 | Karjalainen | |
| 4,281,936 | A | 8/1981 | Schotter et al. | |
| 4,445,782 | A | 5/1984 | Sparrow, Jr. | |
| 4,789,245 | A | 12/1988 | Morbeck | |
| 4,854,721 | A | 8/1989 | Hume | |
| 5,970,851 | A | 10/1999 | Masel et al. | |
| 6,142,661 | A | 11/2000 | Lafond | |
| 6,267,498 | B1 | 7/2001 | Lafond et al. | |
| 6,390,663 | B1 | 5/2002 | Civardi | |
| 6,439,759 | B1 | 8/2002 | Ray et al. | |
| 6,986,442 | B2 | 1/2006 | Engel et al. | |
| 7,040,508 | B2 | 5/2006 | Woersdoerfer et al. | |
| 7,934,864 | B2 | 5/2011 | Heusser et al. | |
| 8,224,481 | B2 | 7/2012 | Bylsma et al. | |
| 8,608,029 | B2 | 12/2013 | Lee | |
| 9,007,588 | B1 | 4/2015 | Igarashi | |
| 10,967,342 | B2 | 4/2021 | Tourel et al. | |
| 11,077,020 | B2 | 8/2021 | Camisani et al. | |
| 11,284,697 | B2 | 3/2022 | De Brugiere | |
| 11,998,102 | B2 | 6/2024 | Brown et al. | |
| 2002/0049557 | A1 | 4/2002 | Chen | |
| 2003/0031085 | A1 | 2/2003 | Baron | |
| 2004/0052157 | A1 | 3/2004 | Drie | |
| 2005/0088911 | A1 | 4/2005 | Sordelli et al. | |
| 2008/0144426 | A1 | 6/2008 | Janssen et al. | |
| 2010/0024361 | A1 | 2/2010 | Ebeling | |
| 2016/0081452 | A1 | 3/2016 | Brugger | |
| 2017/0172173 | A1 | 6/2017 | Navarro et al. | |
| 2017/0246602 | A1 | 8/2017 | Dean et al. | |
| 2017/0304789 | A1* | 10/2017 | Tourel | B01F 35/7546 |
| 2020/0121055 | A1 | 4/2020 | Le Grand et al. | |
| 2020/0122105 | A1 | 4/2020 | Deffrennes et al. | |
| 2020/0129941 | A1 | 4/2020 | Bachellier et al. | |
| 2020/0163434 | A1 | 5/2020 | De Brugiere et al. | |
| 2020/0178670 | A1 | 6/2020 | Bachellier et al. | |
| 2020/0215568 | A1 | 7/2020 | Waldo et al. | |
| 2022/0053910 | A1 | 2/2022 | Da Palma et al. | |
| 2022/0053911 | A1 | 2/2022 | Maisonneuve et al. | |
| 2022/0053912 | A1 | 2/2022 | Pollet et al. | |
| 2022/0054994 | A1 | 2/2022 | Pollet et al. | |
| 2022/0054995 | A1 | 2/2022 | Maisonneuve et al. | |
| 2022/0061492 | A1 | 3/2022 | Maisonneuve et al. | |
| 2022/0061493 | A1 | 3/2022 | Pollet et al. | |
| 2022/0061494 | A1 | 3/2022 | Da Palma et al. | |
| 2022/0061499 | A1 | 3/2022 | Pollet et al. | |
| 2022/0061500 | A1 | 3/2022 | Normand et al. | |
| 2022/0062840 | A1 | 3/2022 | Maisonneuve et al. | |
| 2022/0111342 | A1 | 4/2022 | Orsita et al. | |
| 2023/0240942 | A1 | 8/2023 | Tischler et al. | |

FOREIGN PATENT DOCUMENTS

| | | | | |
|---|---|---|---|---|
| DE | 3729491 | A1 | 3/1988 | |
| DE | 9017592 | U1 | 5/1991 | |
| DE | 4042298 | A1 | 7/1992 | |
| DE | 4426421 | A1 | 2/1996 | |
| EP | 0792820 | A2 | 9/1997 | |
| EP | 0968760 | A1 | 1/2000 | |
| EP | 1295544 | A2 | 3/2003 | |
| EP | 1813334 | A2 | 8/2007 | |
| EP | 2038189 | B1 | 5/2011 | |
| FR | 2364057 | A1 | 4/1978 | |
| FR | 2781695 | A1 * | 2/2000 | B01F 11/0065 |
| FR | 2795658 | A1 | 1/2001 | |
| FR | 2979833 | A1 | 3/2013 | |
| FR | 3013036 | A1 | 5/2015 | |
| FR | 3026622 | B1 | 12/2016 | |
| FR | 3067911 | A1 | 12/2018 | |
| GB | 2551411 | A | 12/2017 | |
| JP | S62298433 | A | 12/1987 | |
| JP | 2003525817 | A | 9/2003 | |
| JP | 201077114 | A | 4/2010 | |
| JP | 2012116809 | A | 6/2012 | |
| JP | 2016518845 | A | 6/2016 | |
| JP | 2017533011 | A | 11/2017 | |
| WO | 9967646 | A1 | 12/1999 | |
| WO | 0009416 | A2 | 2/2000 | |
| WO | 0222466 | A1 | 3/2002 | |
| WO | 2004031051 | A1 | 4/2004 | |
| WO | 2014181158 | A1 | 11/2014 | |
| WO | 2016055725 | A1 | 4/2016 | |
| WO | 2018234657 | A1 | 12/2018 | |
| WO | 2018234658 | A1 | 12/2018 | |
| WO | 2018234699 | A1 | 12/2018 | |
| WO | 2018234700 | A1 | 12/2018 | |
| WO | 2020127909 | A1 | 6/2020 | |
| WO | 20200127905 | A1 | 6/2020 | |

OTHER PUBLICATIONS

Wuyi, S. et al., "Tutorial on Clinical Techniques in medical cosmetic surgery," Chinese Medical Antiquities Publishing House, Mar. 2005, pp. 72, ISBN 7-80174-299-0.

International Search Report for PCT/FR2019/053240 mailed Mar. 25, 2020; 2 pages.

French preliminary Search Report including Written Opinion for Application No. 1873818 mailed Nov. 21, 2019, pp. 1-8.

French preliminary Search Report including Written Opinion for Application No. 1873821 mailed Nov. 21, 2019, pp. 1-9.

International Search Report for Application No. PCT/EP019/086589, mailed Mar. 25, 2020, 2 pages.

International Search Report for Application No. PCT/EP2019/086576, dated Apr. 21, 2020, 3 pages.

(56) References Cited

OTHER PUBLICATIONS

International Search Report for Application No. PCT/EP2019/086577, mailing Apr. 21, 2020, 2 pages.
International Search Report for Application No. PCT/EP2019/086580, mailing Apr. 21, 2020, 3 pages.
International Search Report for Application No. PCT/EP2019/086586, mailing Apr. 21, 2020, 3 pages.
International Search Report for Application No. PCT/EP2019/086590, mailed Apr. 21, 2020, 2 pages.
International Search Report for Application No. PCT/EP2019/086578 mailed Mar. 25, 2020, pp. 1-2.
International Search Report for Application No. PCT/EP2019/086582 mailed Mar. 25, 2020, pp. 1-3.
International Search Report for Application No. PCT/EP2019/086583 mailed Apr. 2, 2020, pp. 1-2.
International Search Report for Application No. PCT/EP2019/086587 mailed Apr. 21, 2020, pp. 1-2.
International Search Report for Application No. PCT/EP2019/086588 mailed Apr. 21, 2020, pp. 1-3.
International Search Report for Application No. PCT/FR2019/053239 mailed Mar. 25, 2020, pp. 1-2.
Li Wenbin & Tong Yan, "Fine Chemical Manufacturing Technology", Central Radio and Television University Publishing House-Beijing, Jan. 2014. 5 pgs.

* cited by examiner

[Fig. 1A]
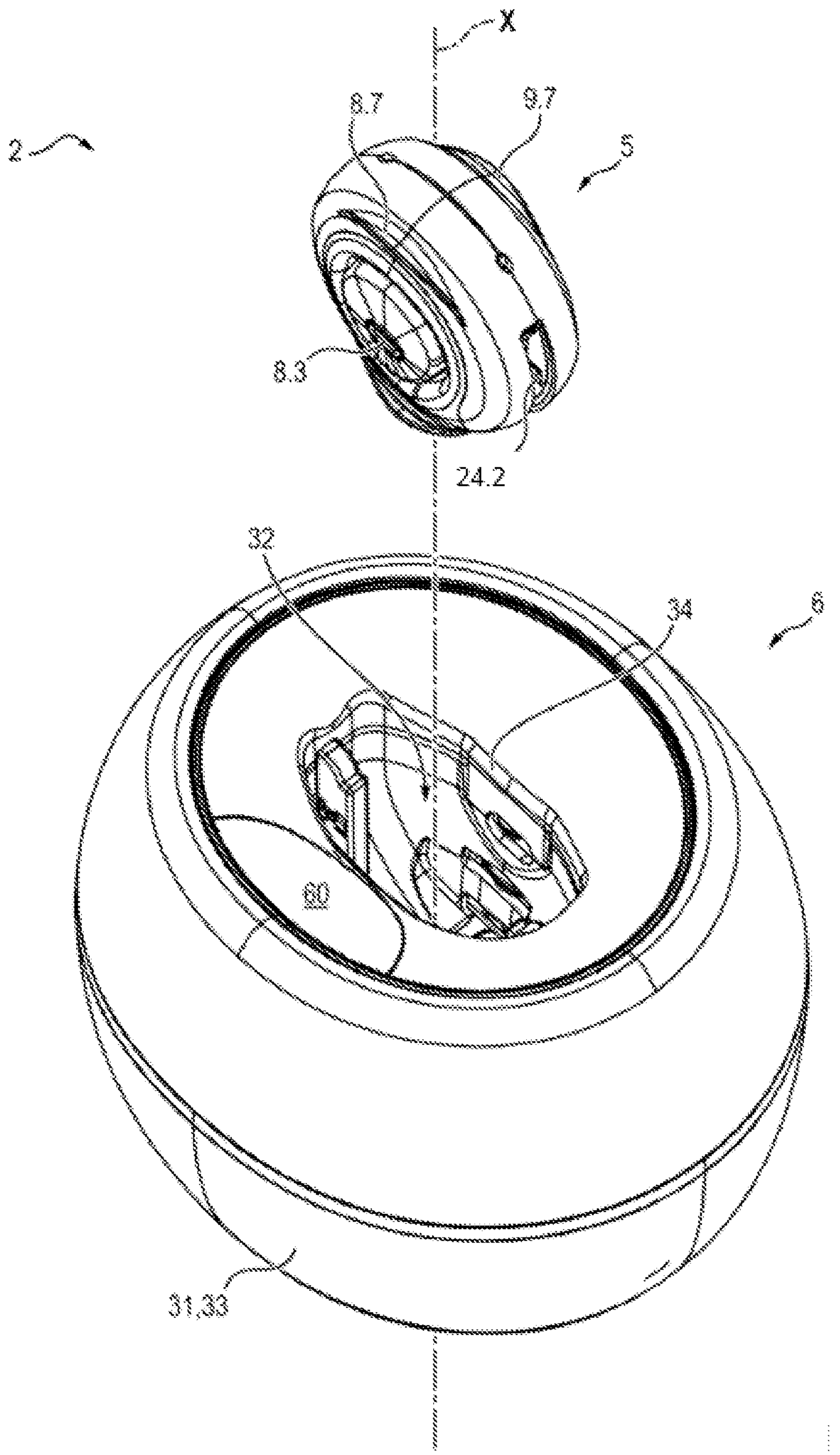

[Fig. 1B]
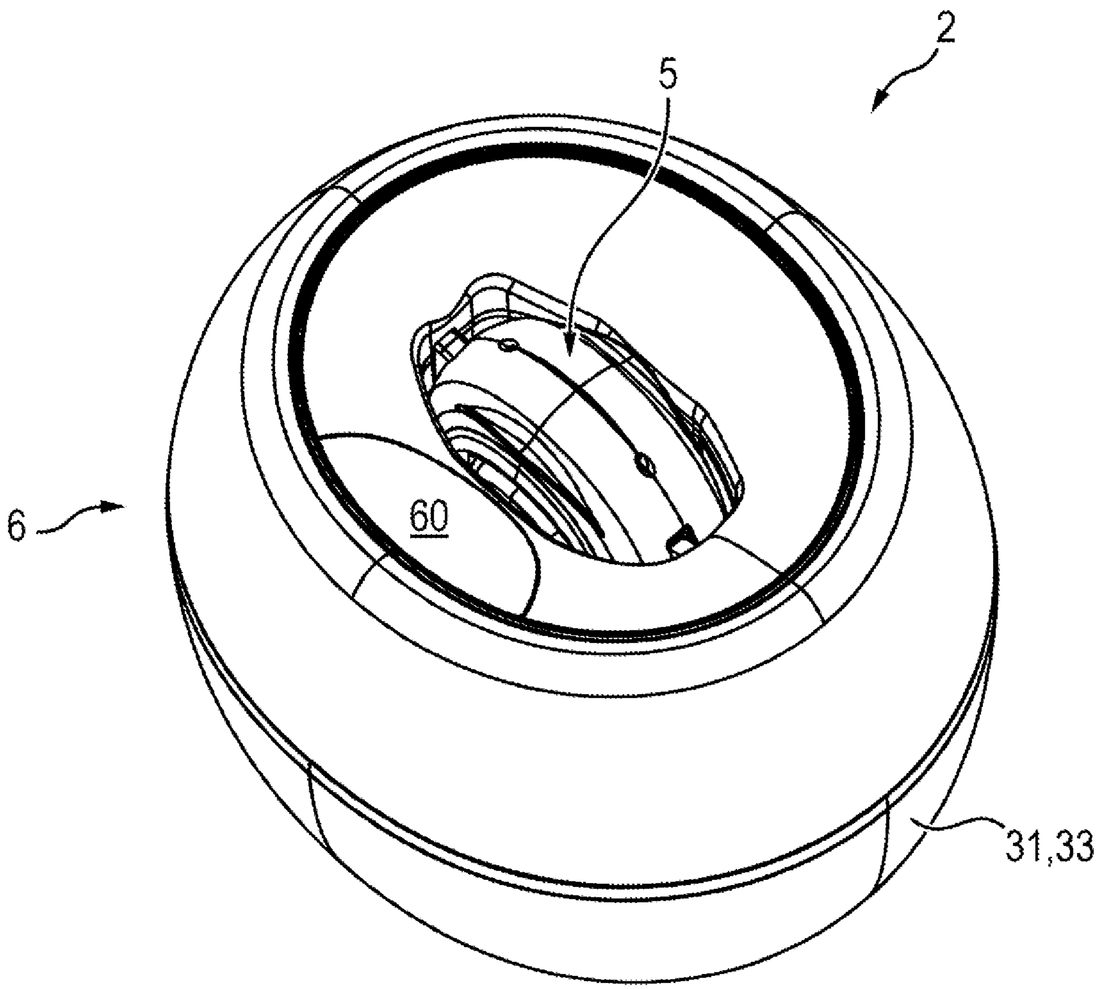

[Fig. 2A]
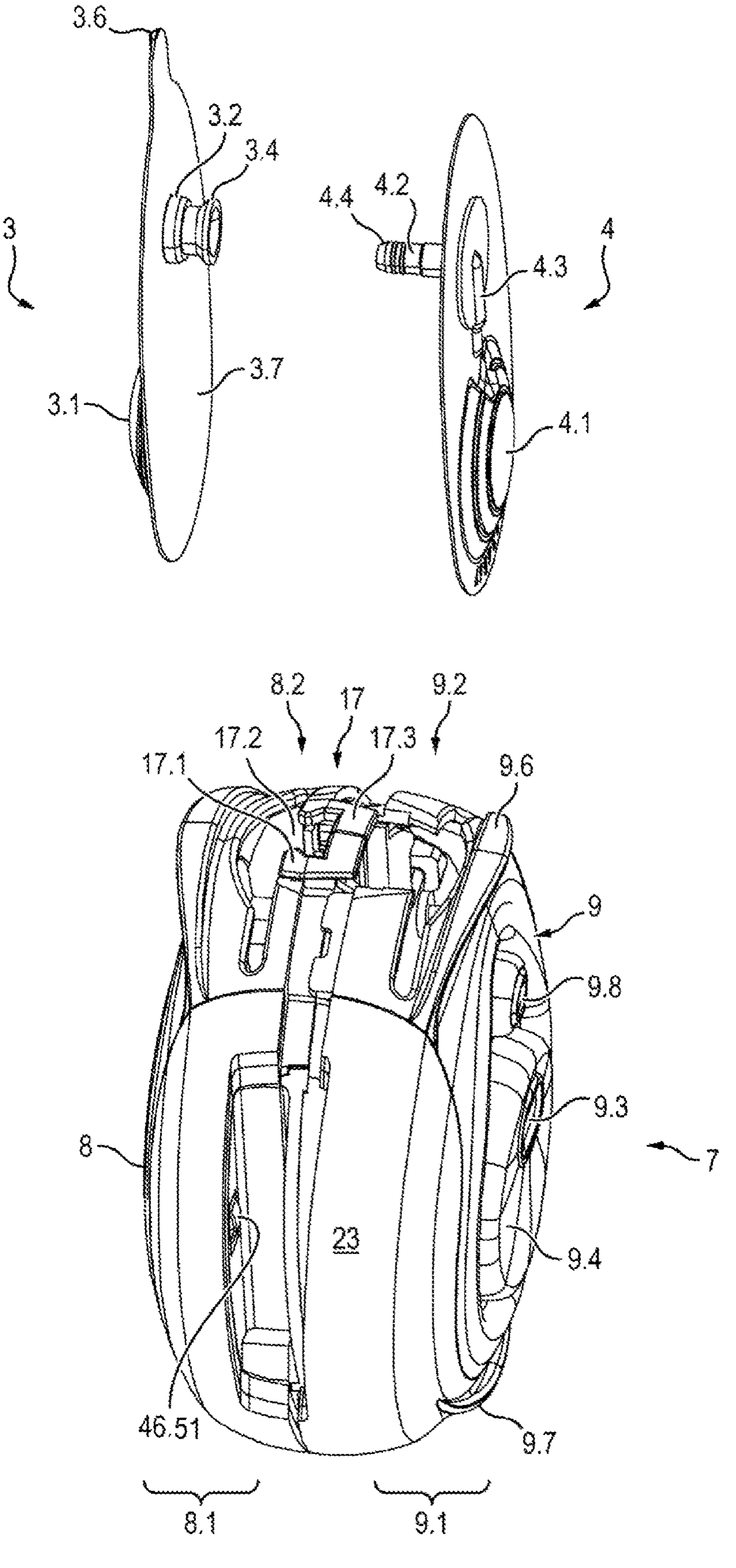

[Fig. 2B]
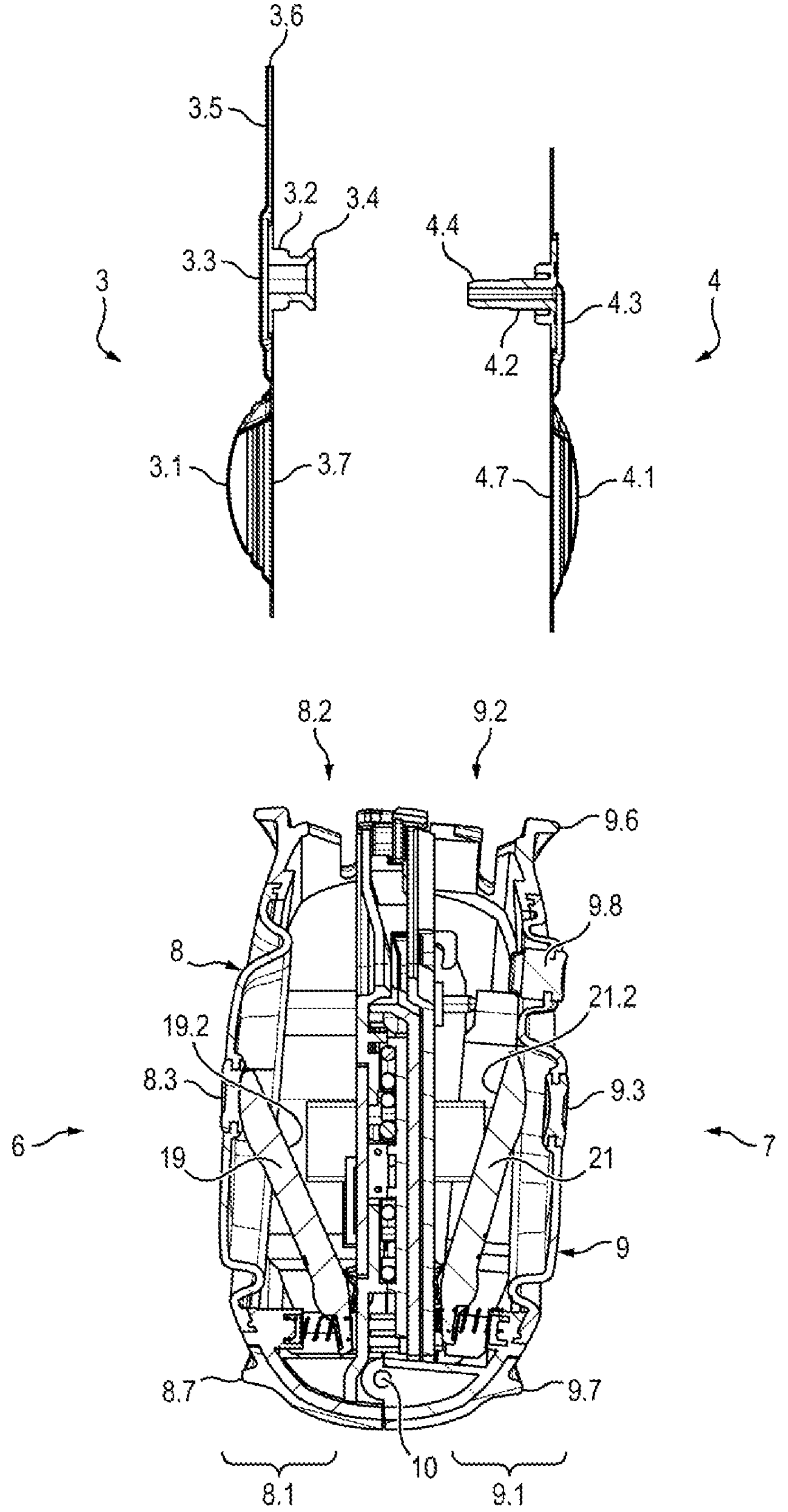

[Fig. 3A]
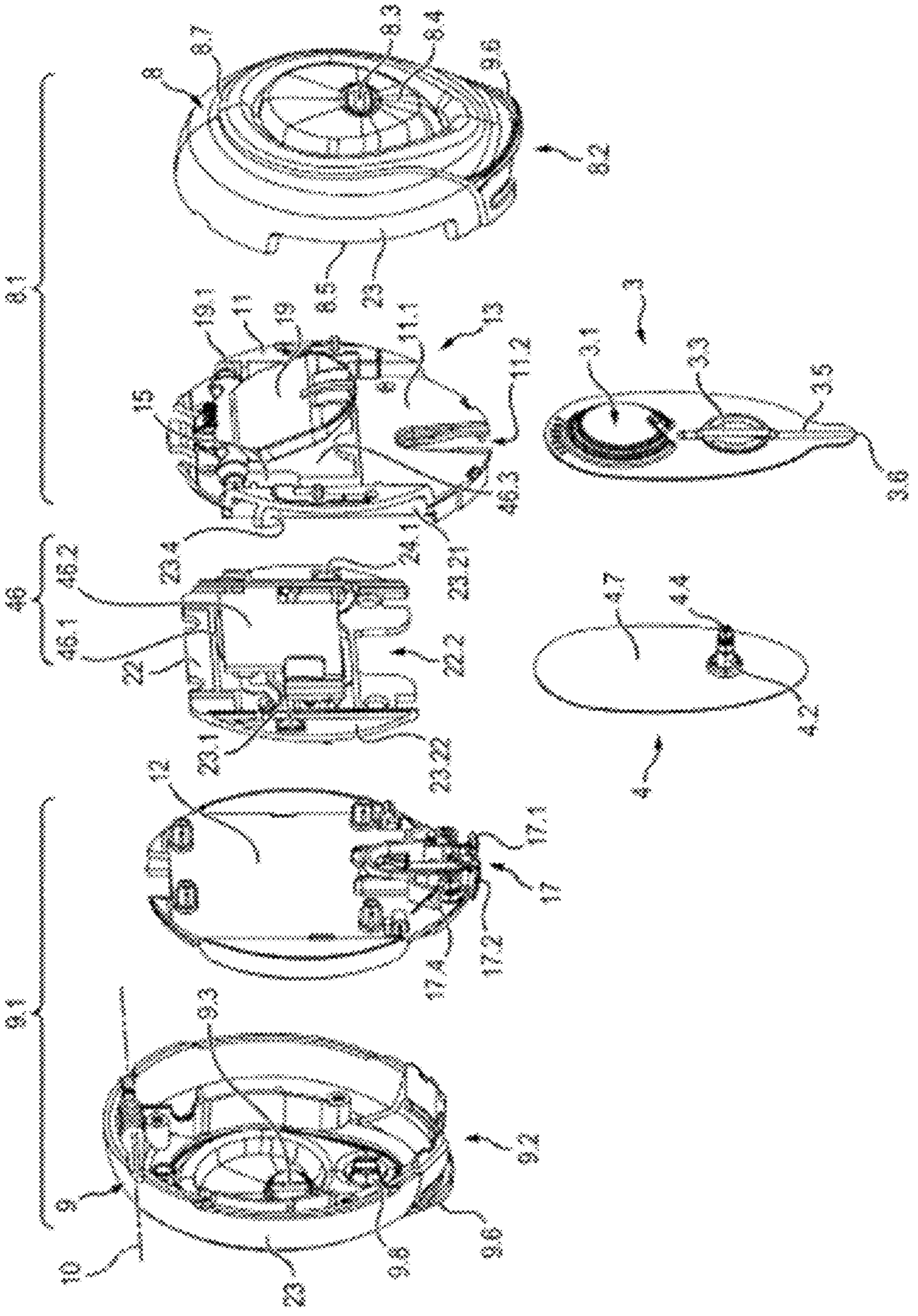

[Fig. 3B]
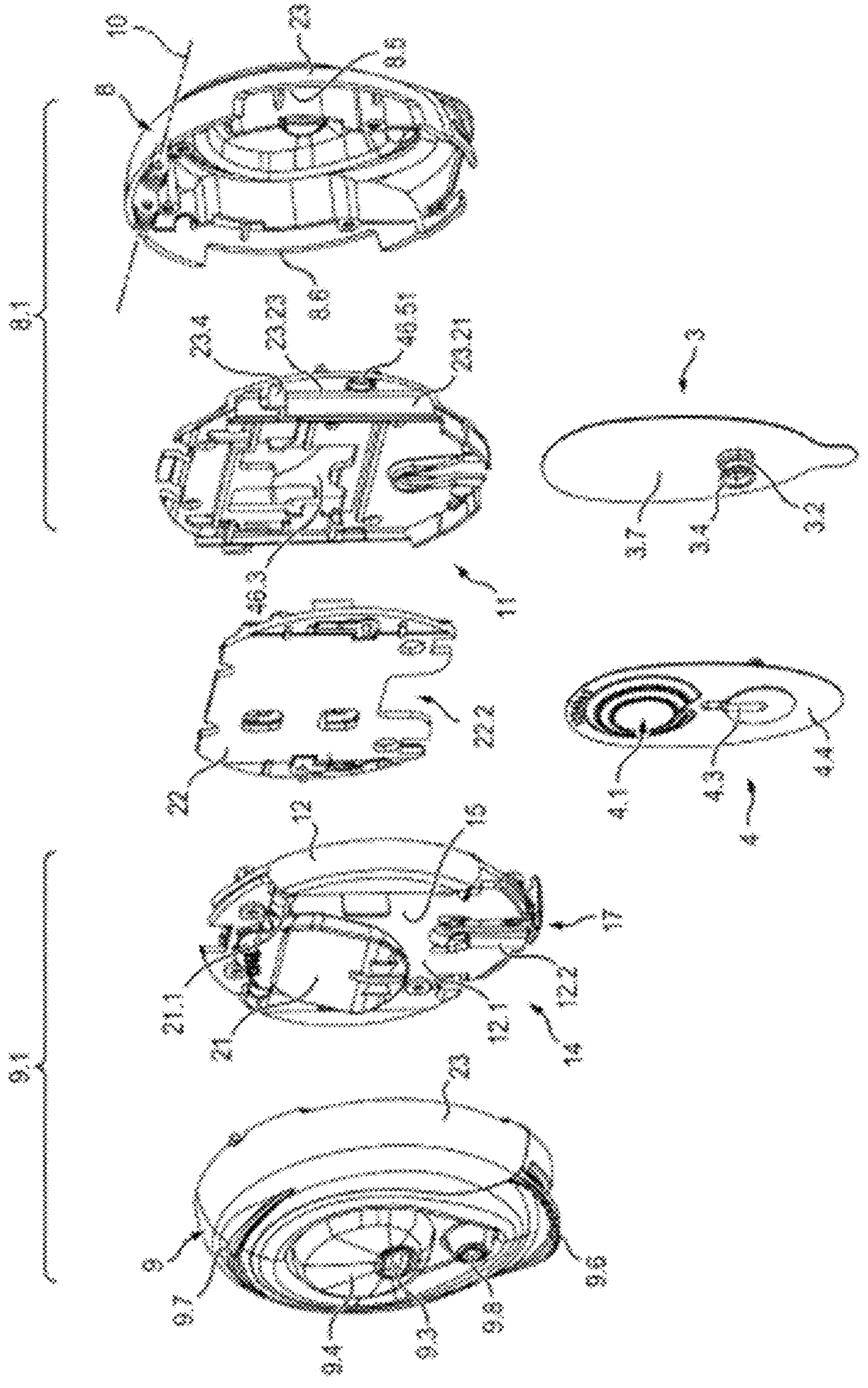

[Fig. 4A]
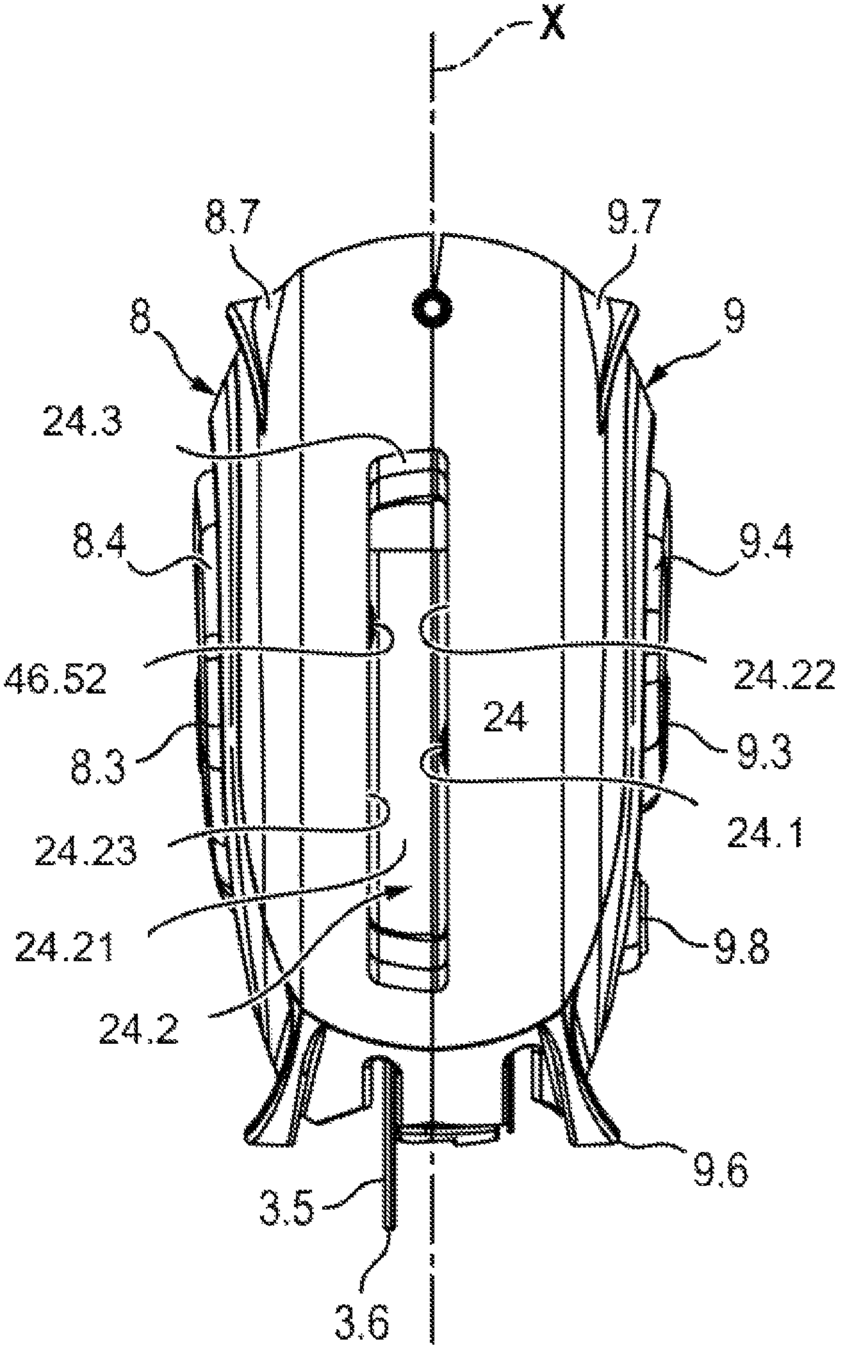

[Fig. 4B]
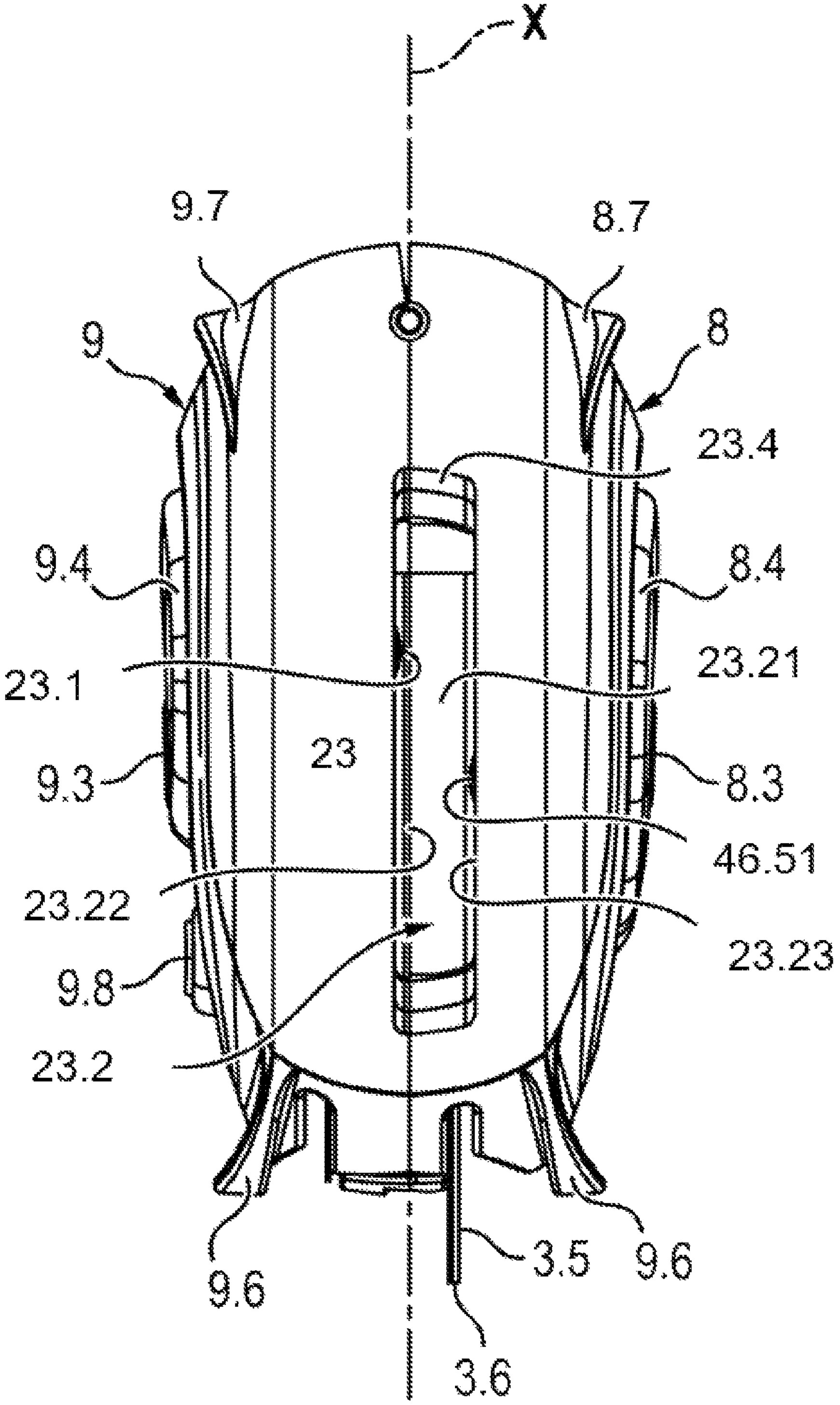

[Fig. 5]
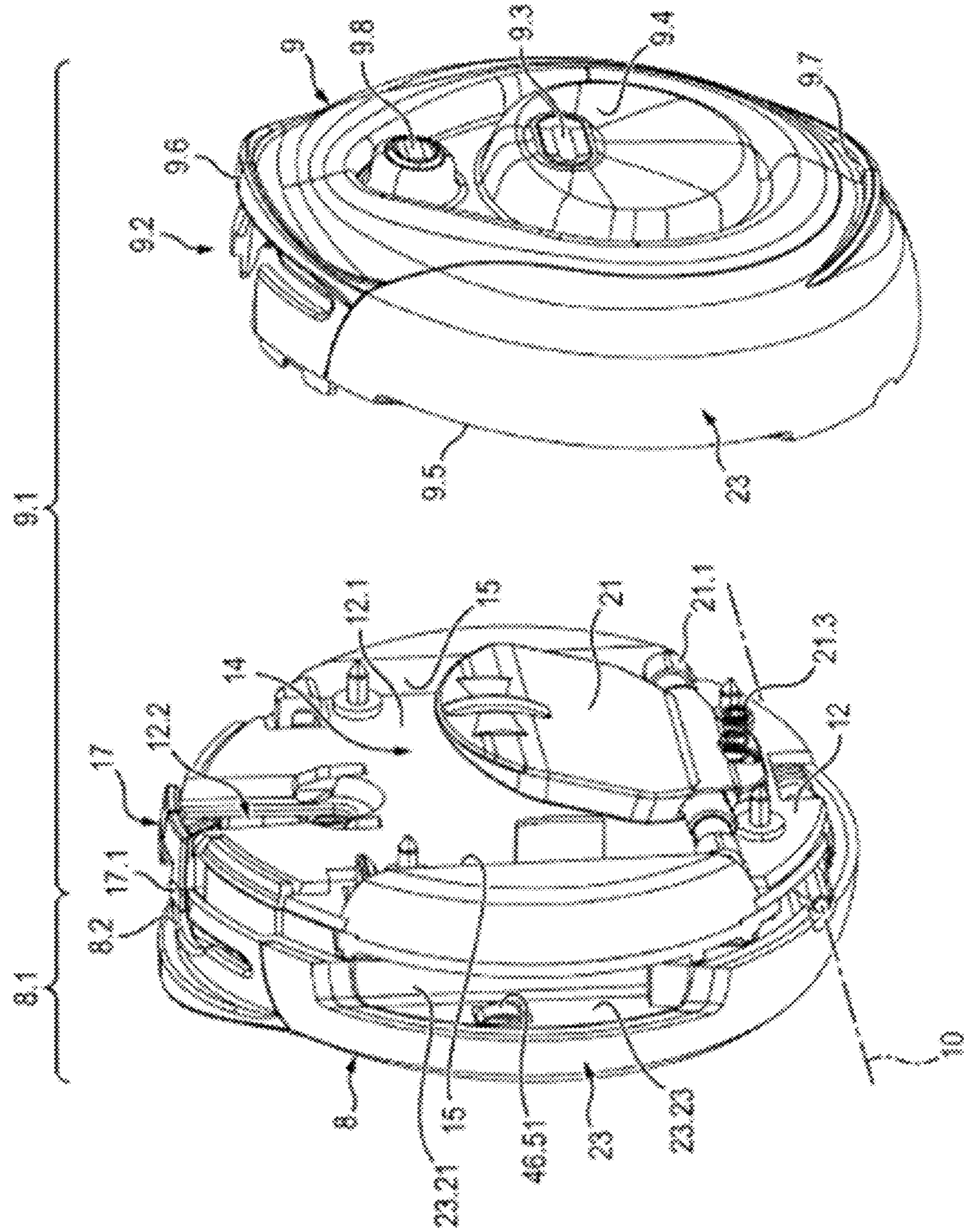

[Fig. 6]
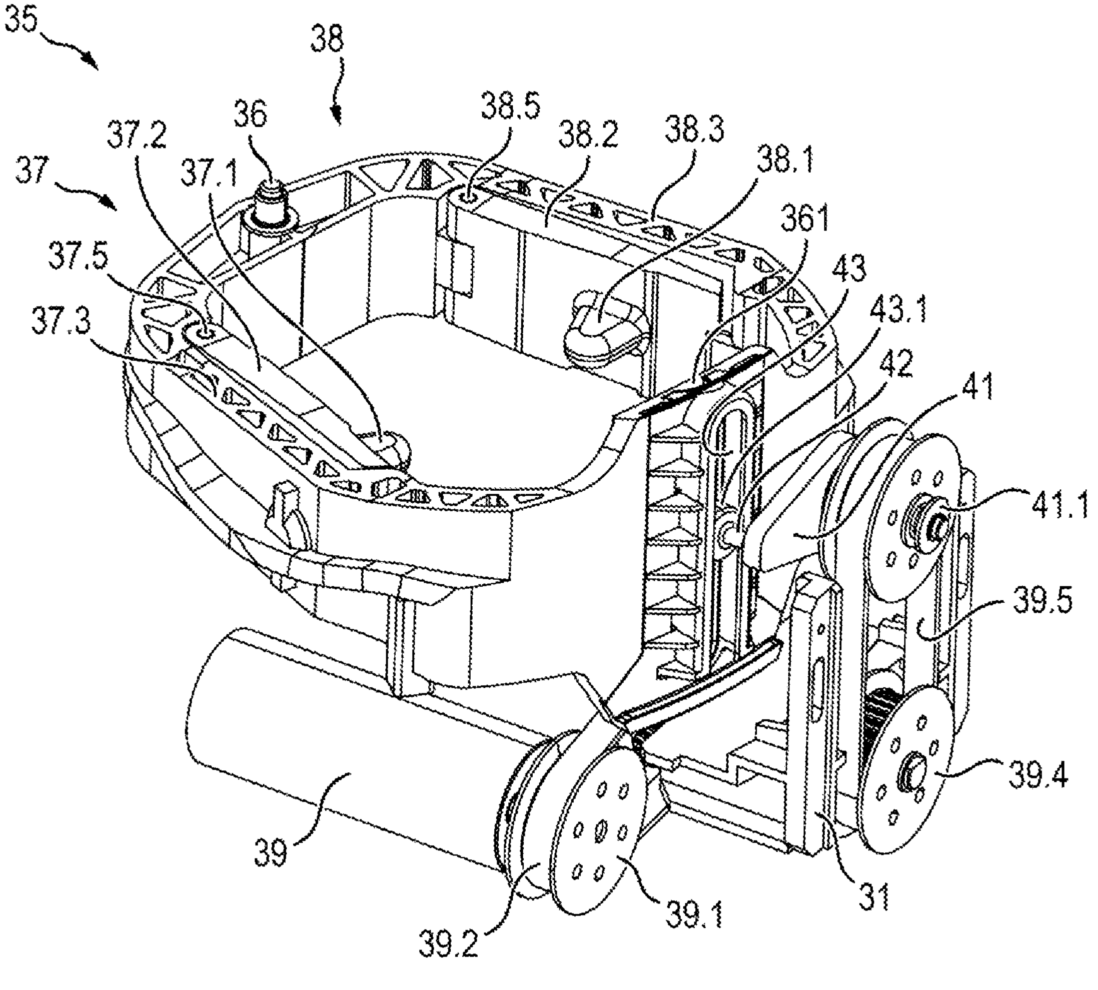

[Fig. 7A]
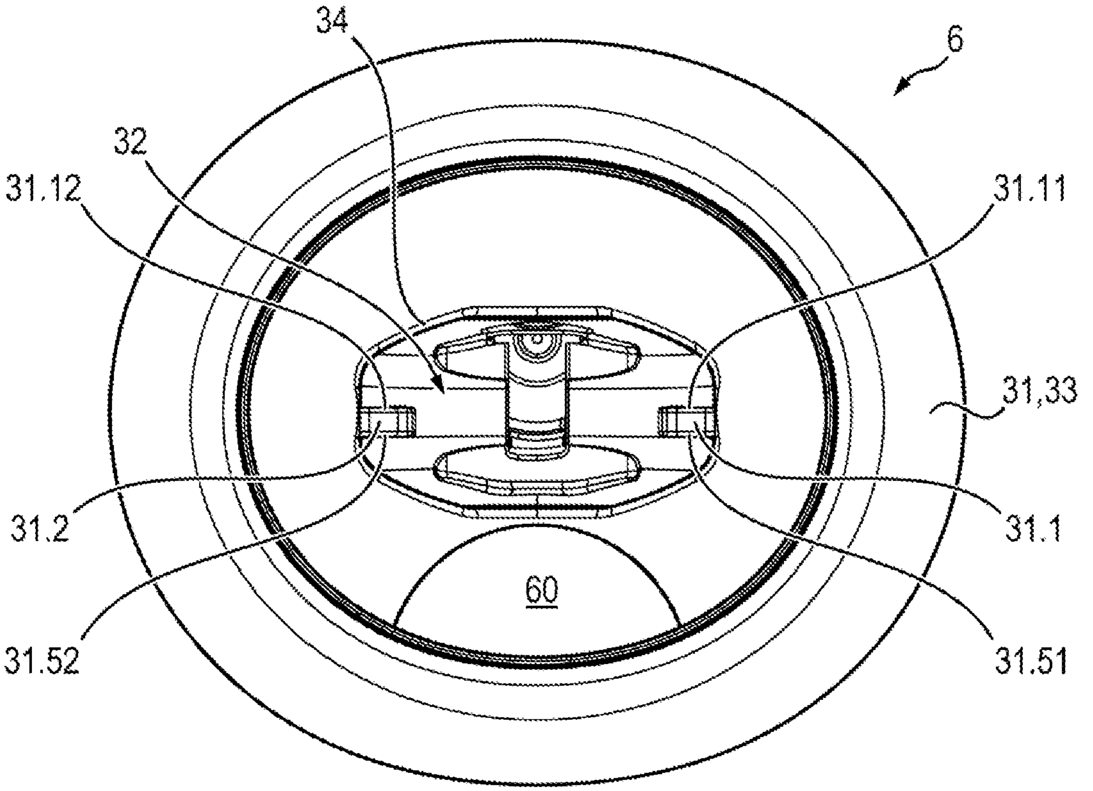
[Fig. 7B]
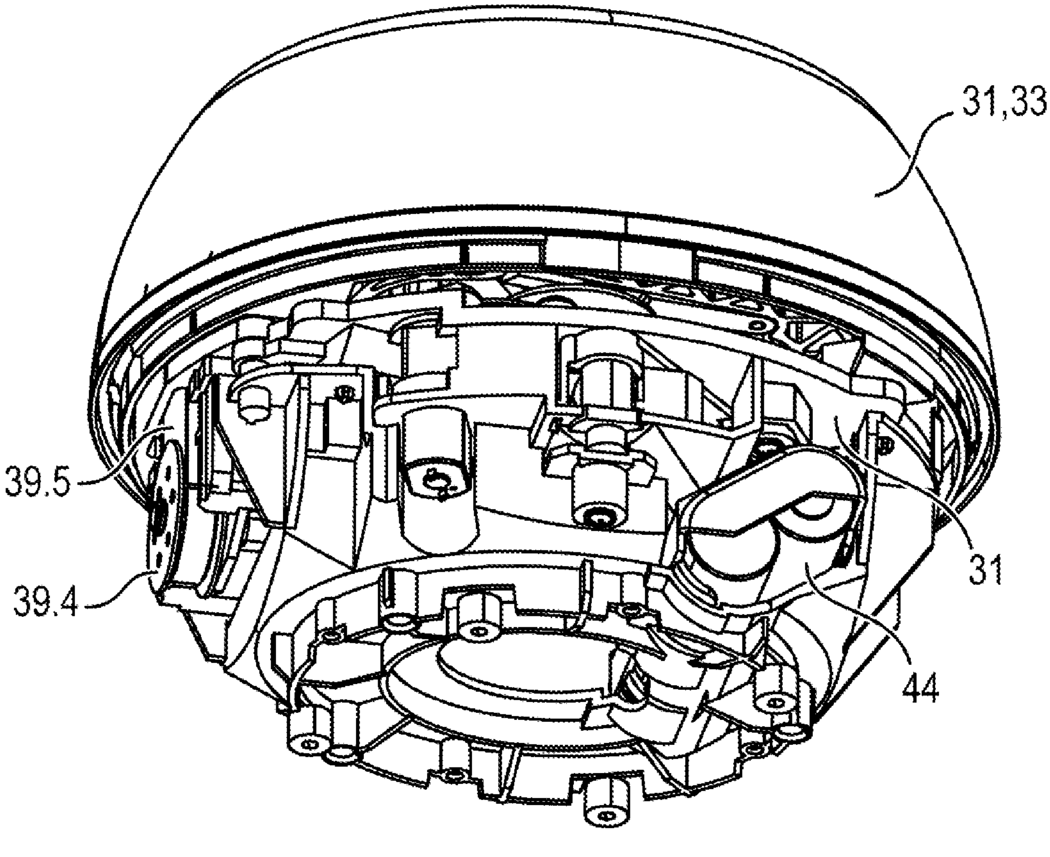

[Fig. 8A]
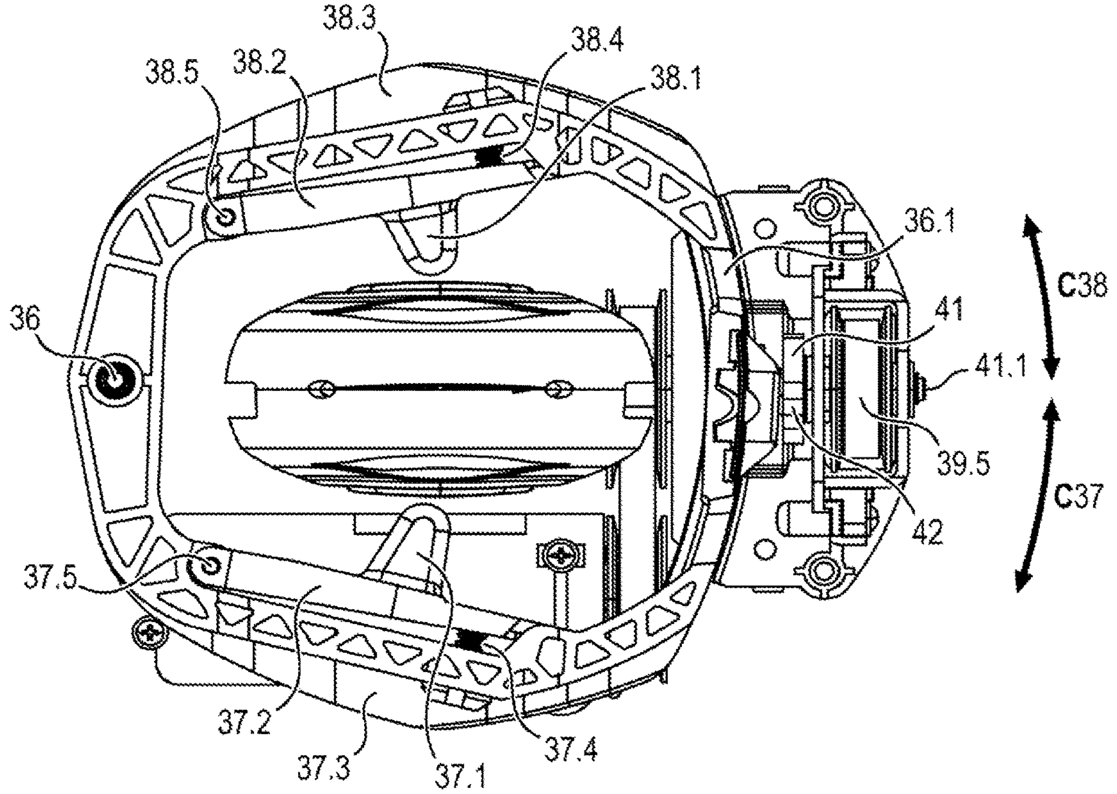
[Fig. 8B]
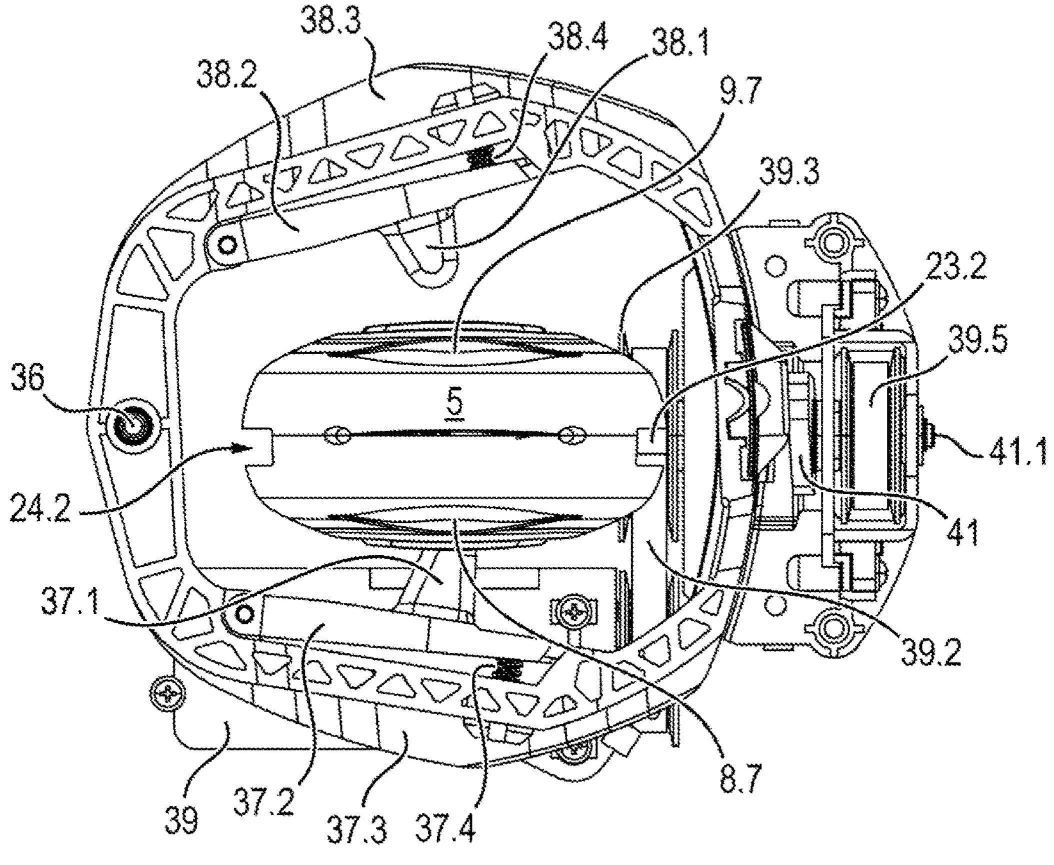

[Fig. 8C]
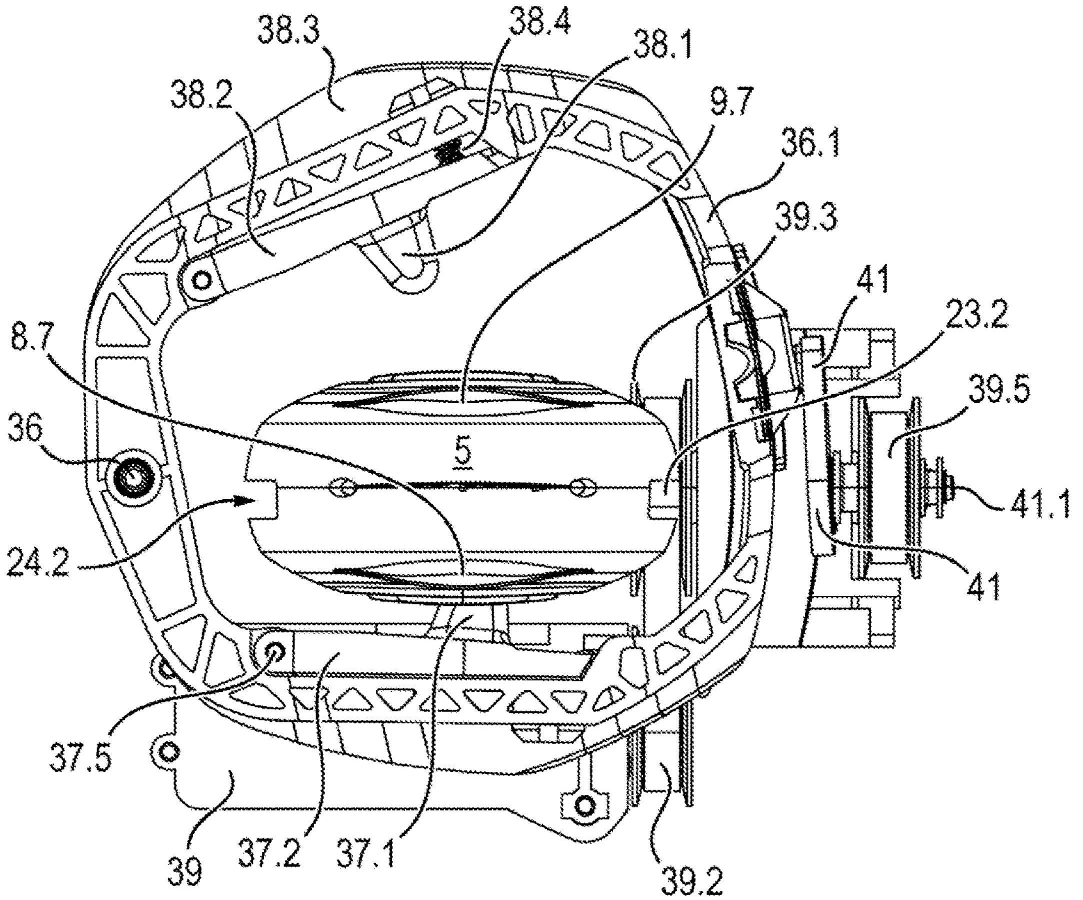
[Fig. 9]
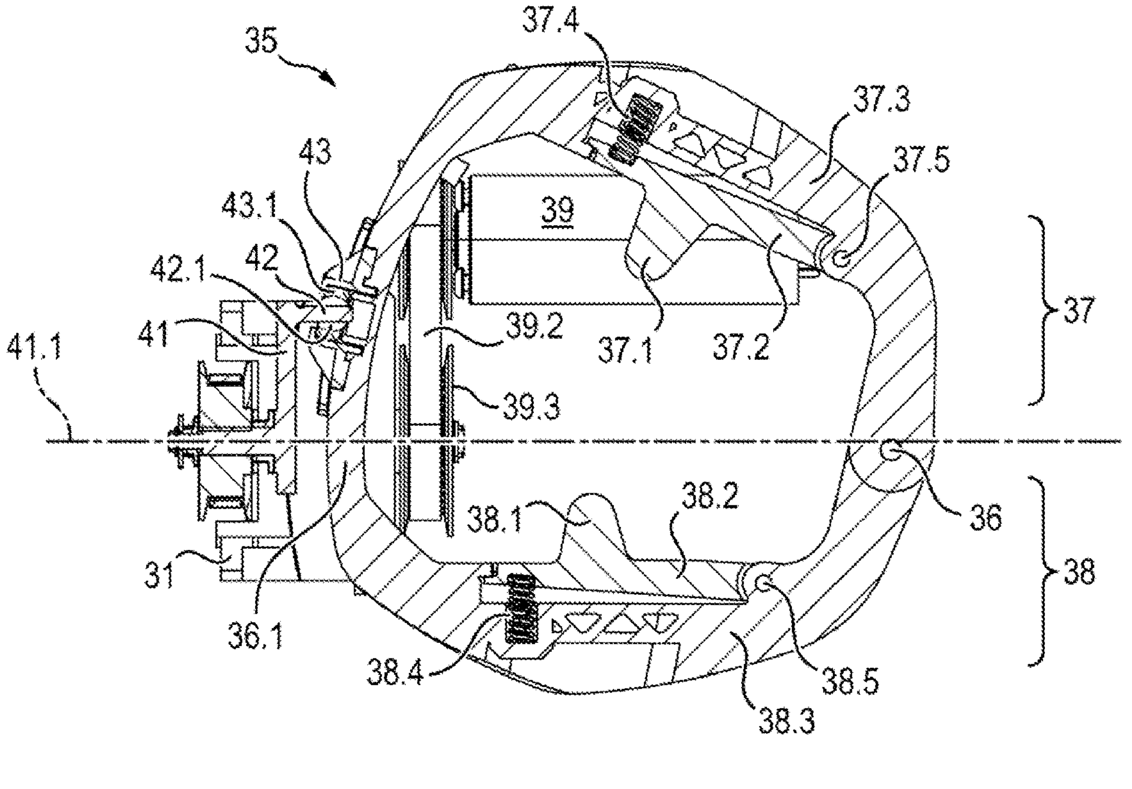

[Fig. 10A]
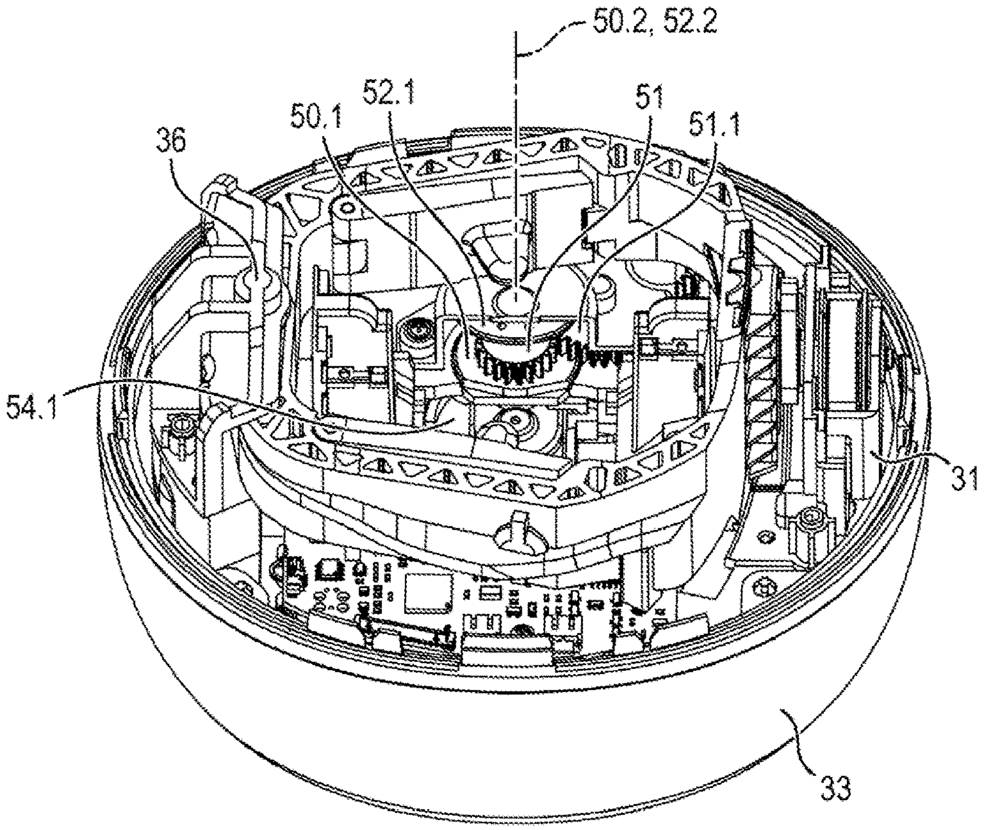
[Fig. 10B]
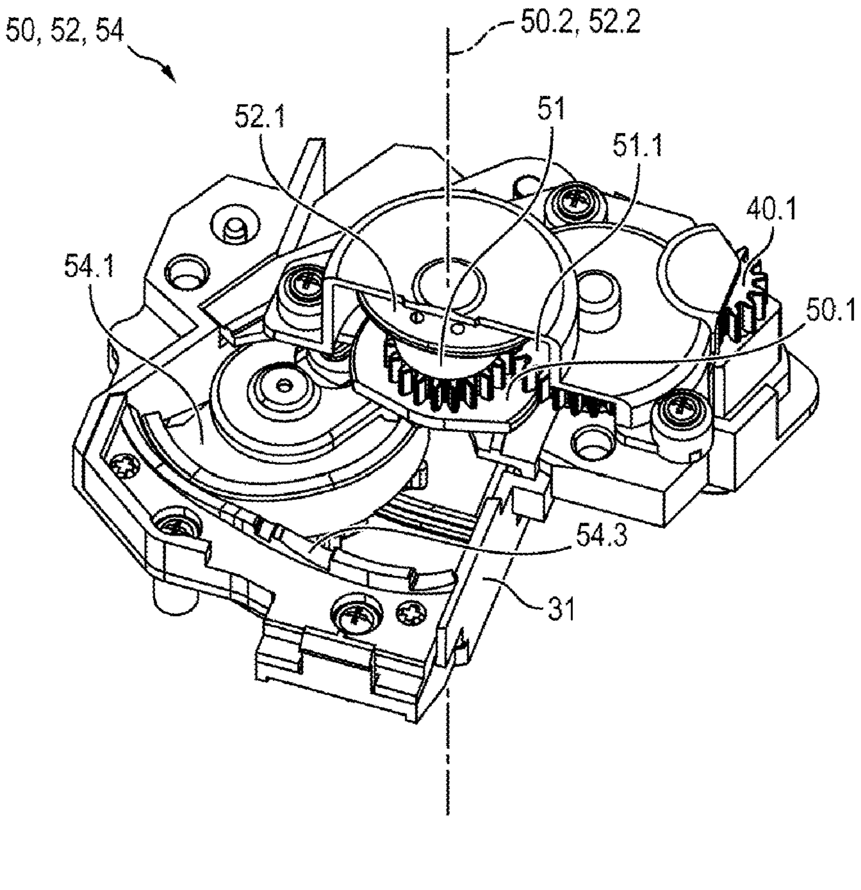

[Fig. 10C]
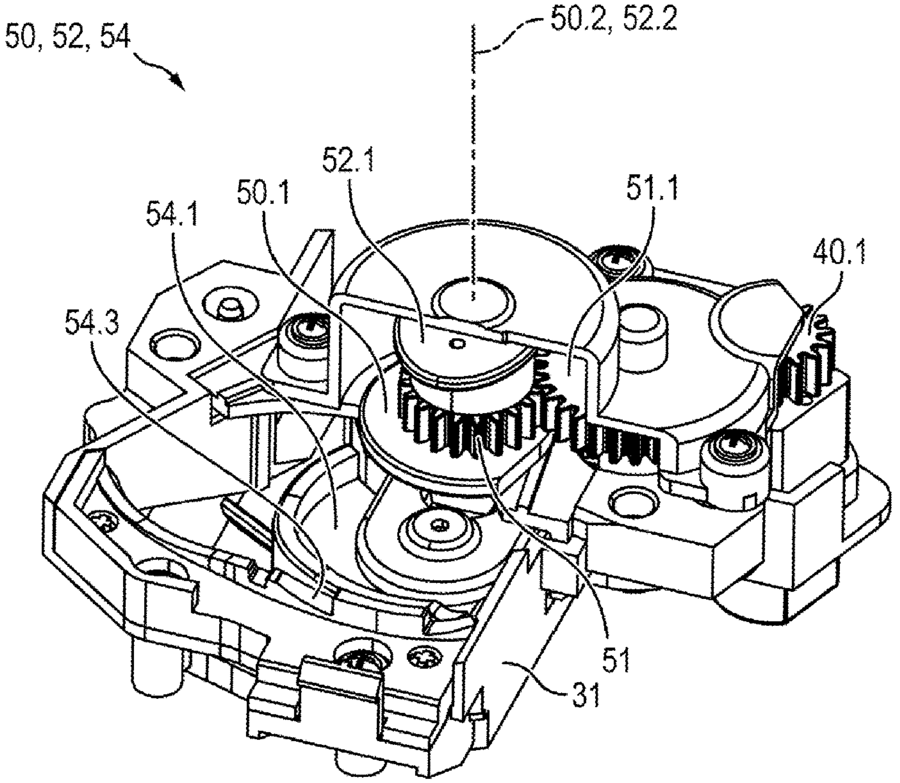
[Fig. 10D]
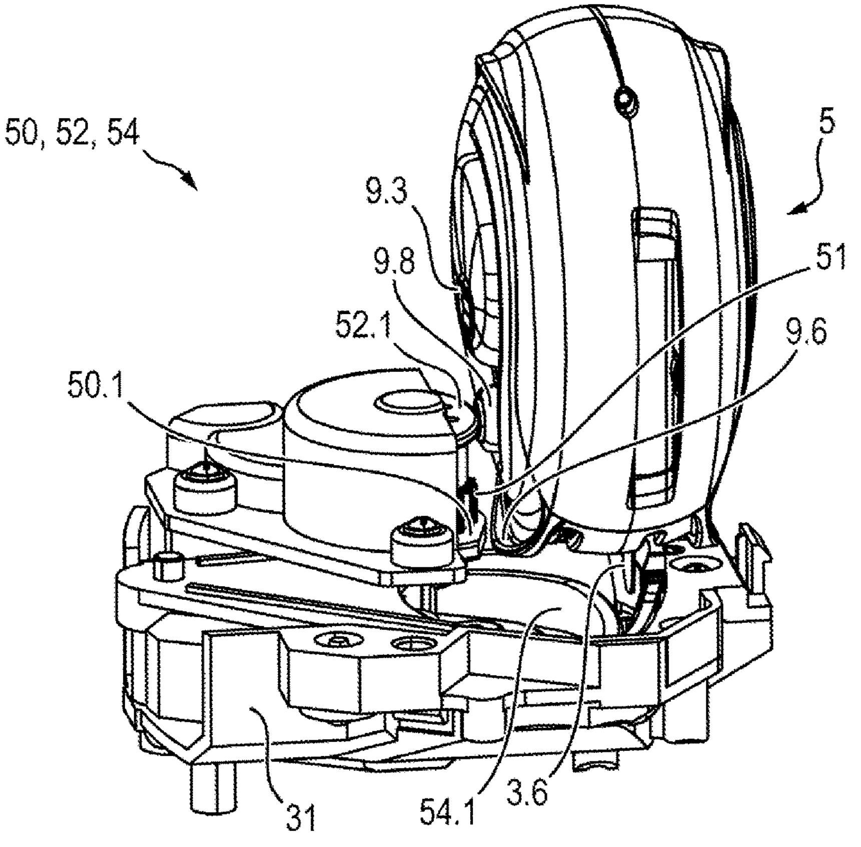

[Fig. 10E]
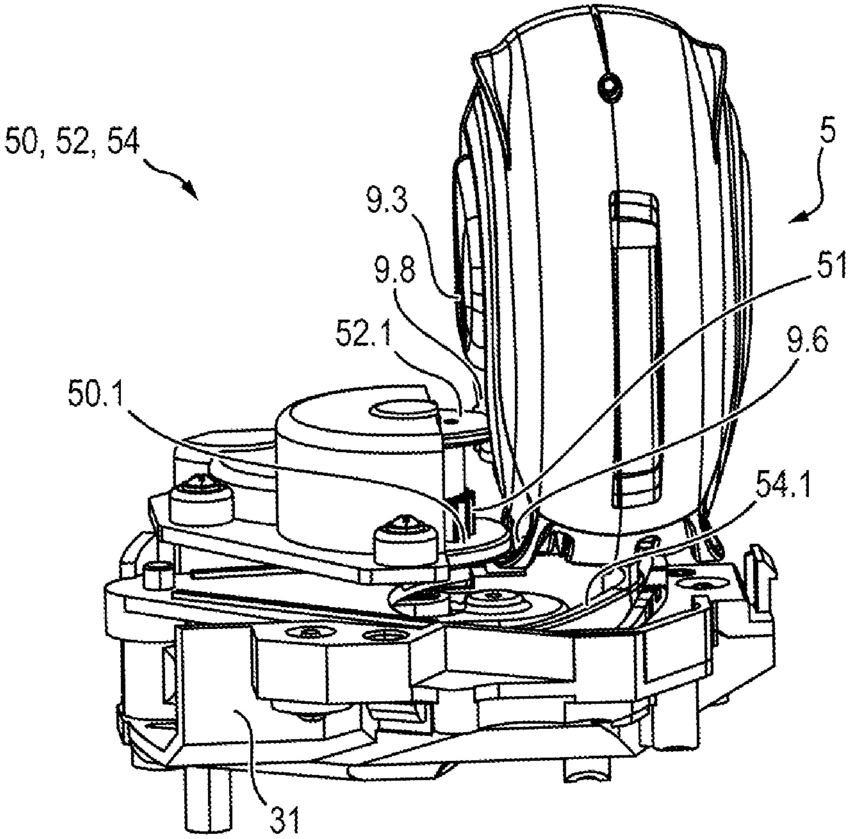

[Fig. 10F]
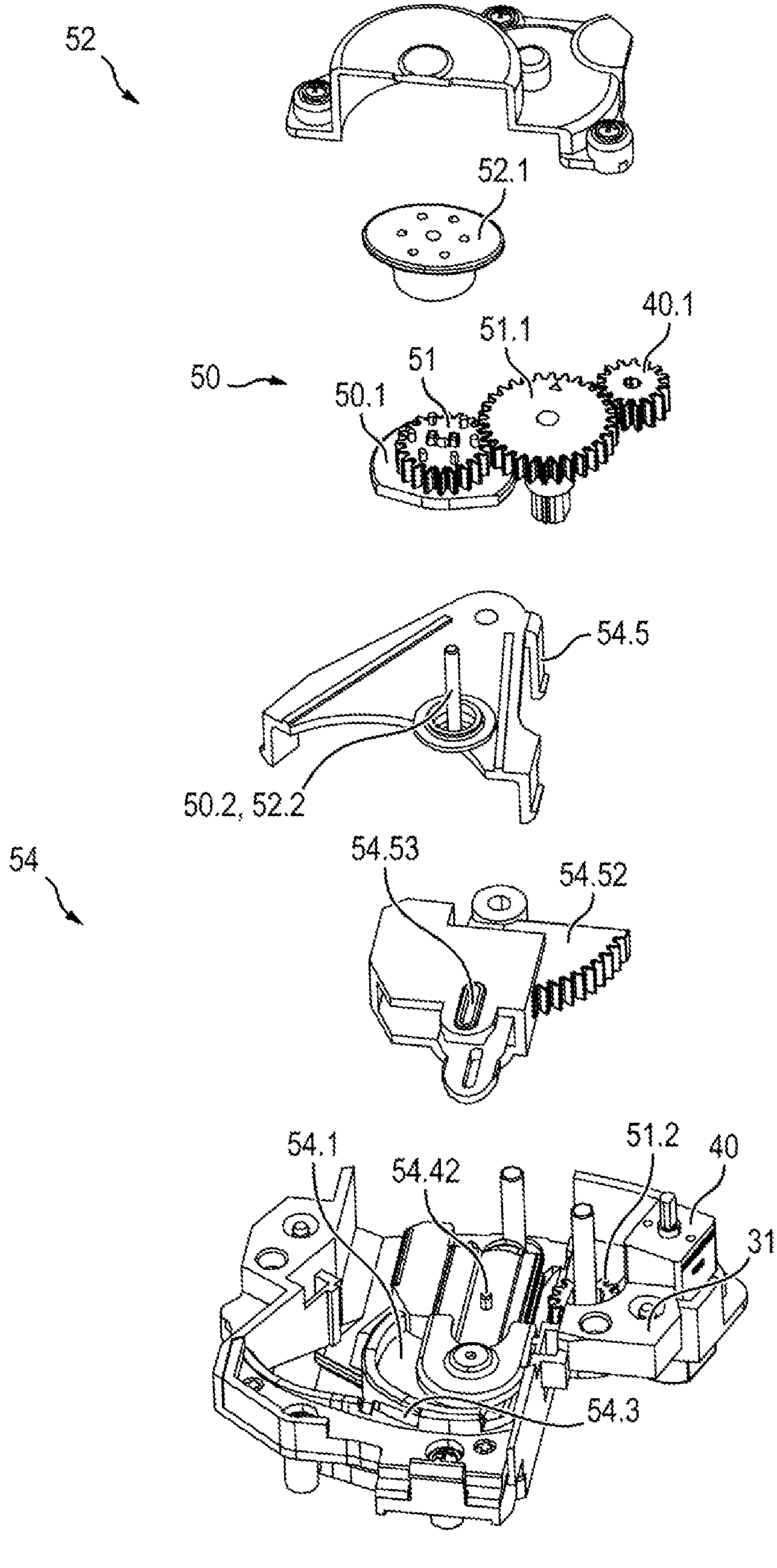

[Fig. 11A]
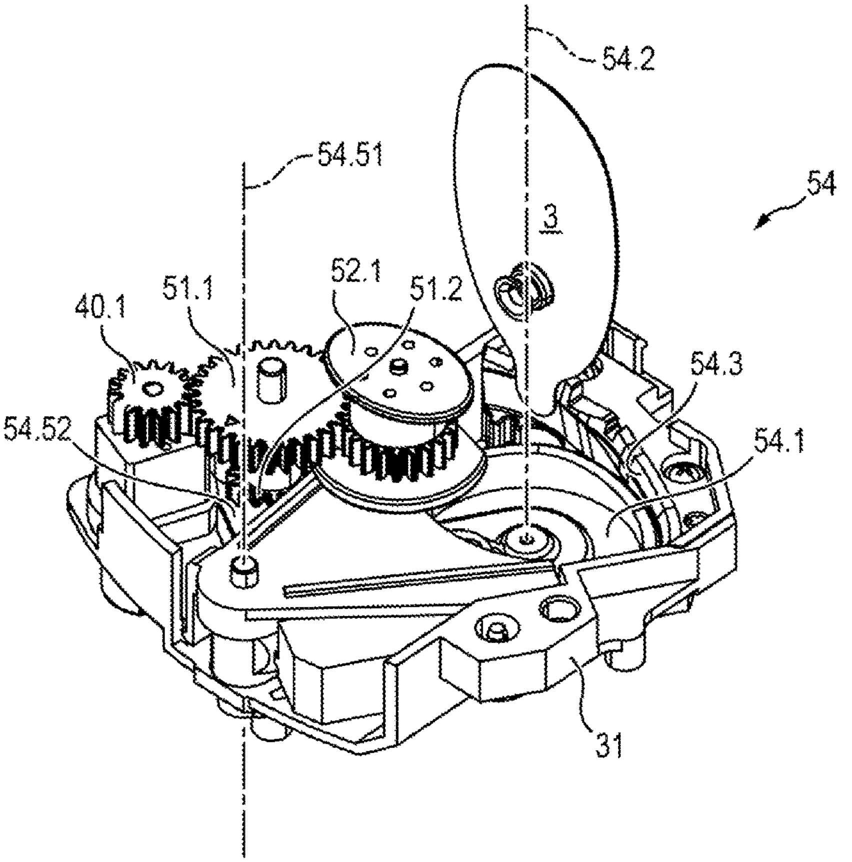
[Fig. 11B]
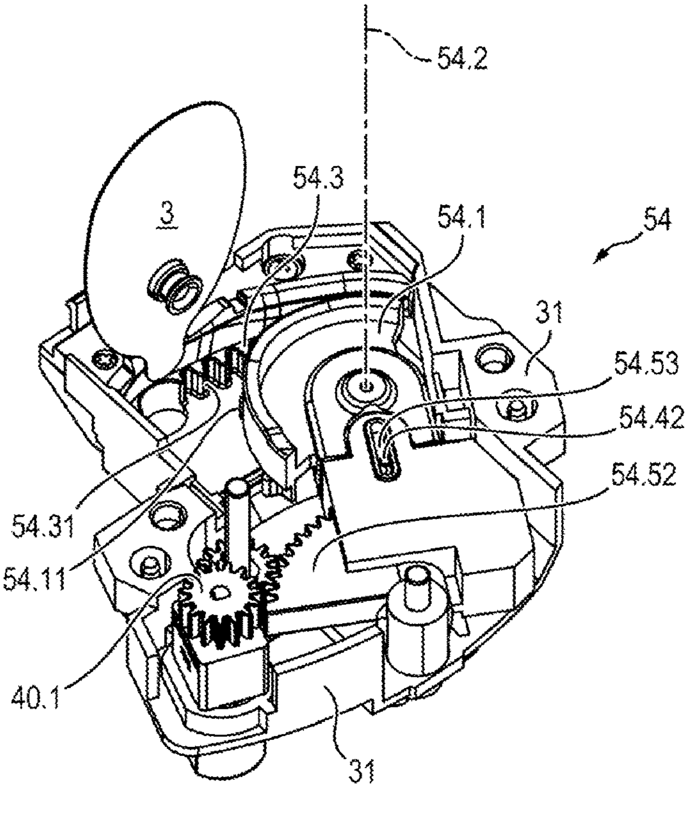

[Fig. 11C]
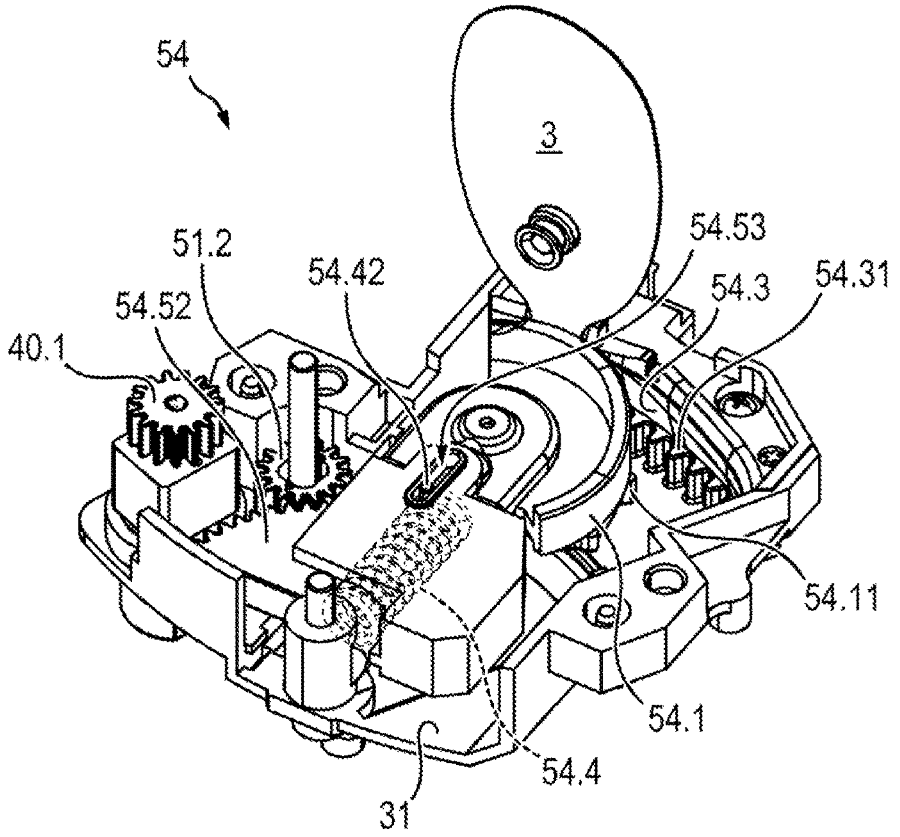
[Fig. 12]
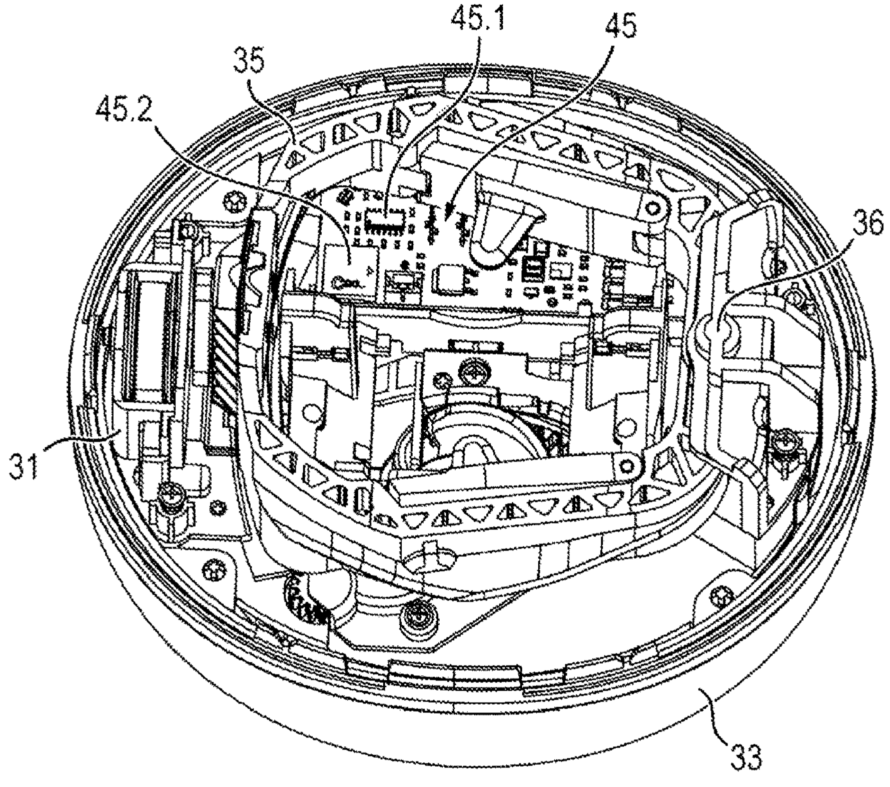

MANUFACTURING APPARATUS, MIXING MACHINE AND/OR RECEIVING DEVICE FOR THE MANUFACTURE OF A COMPOSITION FROM A MIXTURE OF FORMULATIONS

CROSS-REFERENCE TO RELATED APPLICATIONS

The present application is a national phase entry under 35 U.S.C. § 371 of International Application No. PCT/FR2019/053240 filed Dec. 20, 2019, which claims priority from French Application No. 1873818 filed Dec. 21, 2018, all of which are incorporated herein by reference.

GENERAL TECHNICAL FIELD

The present invention relates to a manufacturing apparatus for the manufacture of a composition, in particular a cosmetic composition, or more specifically for the preparation of a composition by mixing two formulations.

STATE OF THE ART

Document FR3026622 discloses a manufacturing apparatus for the manufacture of a composition, and more particularly a cosmetic product, the manufacturing apparatus including:

- a first capsule including a first compartment containing a predetermined amount of a first formulation, and a first connection portion,
- a second capsule including a second compartment containing a predetermined amount of a second formulation, and a second connection portion configured to be connected to the first connection portion, and
- a mixing machine configured to receive the first and second capsules, and to mix the first and second formulations directly inside the first and second capsules so as to obtain the cosmetic product.

The mixing machine includes in particular:

- a first bearing element including a first bearing surface configured to exert, on the first deformable compartment of the first capsule, a pressure force which is orthogonal to the direction of movement of the first bearing element,
- a second bearing element including a second bearing surface configured to exert, on the second deformable compartment of the second capsule, a pressure force which is orthogonal to the direction of movement of the second bearing element, and
- a drive motor mechanically linked to the first and second bearing elements, and configured to allow a cyclic movement of the first and second bearing elements between inactive and active positions. Such a manufacturing apparatus allows the manufacture, by an ultimate consumer, of a personalized cosmetic product from different capsules.

However, the structure of the manufacturing apparatus described in document FR3026622 requires providing a drive motor of significant size in order to transmit, to the first and second deformable compartments, pressure forces adapted to ensure a migration of the content from the first compartment towards the second compartment, and conversely a migration of the content from the second compartment towards the first compartment, and this particularly when the first and second deformable compartments or link channels associated with the first and second deformable compartments are closed by a weakened weld area.

The prediction of a drive motor with a significant size increases substantially the manufacturing costs of the manufacturing apparatus as well as the volume and weight thereof.

In addition, the mixing of the capsules turns out to be more complex than expected and requires improvements both in the material and in the way in which the material is used.

Presentation of the Invention

The present invention aims at overcoming all or part of these drawbacks.

The technical problem underlying the invention therefore consists in providing an apparatus for manufacturing a composition which is simple, compact and easy to use, while having a simple structure and a reduced price.

Particularly, during the preparation of the composition by mixing the two formulations, the management of the preparation time, of the heating and of the kneading is complex, in particular because of the fragility of the formulation. It is furthermore important to know when to end the mixing method.

In this regard, the invention proposes a mixing method using a manufacturing apparatus comprising a mixing machine comprising a support defining a receiving housing, the receiving housing comprising a first receiving location configured to receive a first deformable capsule and a second receiving location configured to receive a second deformable capsule, the first and second capsules being intended to be fluidly linked to each other and containing respectively a first formulation and a second formulation,

- the manufacturing apparatus comprising an actuation system configured to transmit a pressure force to the first and second capsules in order to move the content of the first capsule in the second capsule, and vice versa,
- the mixing machine comprising a heater element configured to heat at least one of the first and second capsules when the first and second capsules are received in the mixing machine, the method comprising the following steps:
  - Heating step (Em3) and/or kneading step (Em4, Em5) comprising, alternately or simultaneously, setting in motion of the actuation system and heating by means of the heater element, up to a target temperature (Tc), then
  - Step of cooling with kneading (Em6) through setting in motion of the actuation system up to a withdrawal temperature (Tr) from which the kneading is stopped.

In one embodiment, the cooling step (Em6) is implemented for a predetermined period of time, for example at least 20 s, and preferably at least 30 s.

In one embodiment, the withdrawal temperature (Tr) corresponds to a temperature of the heater element comprised between 55° C. and 60° C. or such that the temperature of the content of the first capsule and/or of the second capsule is comprised between 35° C. and 50° C. and preferably between 38° C. and 42° C.

In one embodiment, the target temperature (Tc) is greater than the withdrawal temperature (Tr) by at least 20° C.

In one embodiment, the heating step (Em3) and/or the kneading step (Em4, Em5) comprise(s) successively:

- a heating step (Em3), a step of kneading with heating (Em5) with the actuation system, in order to maintain the temperature at the target temperature (Tc).

In one embodiment, the kneading step (Em4, Em5, Em6) comprises a step of kneading without heating (Em4), by means of the actuation system, between the heating step (Em3) and the step of kneading with heating (Em5).

In one embodiment, the manufacturing apparatus comprises a receiving device configured to receive the first capsule and the second capsule.

In one embodiment, the cooling step (Em6) is followed by at least one step of a withdrawal method (Er) during which the actuation system can be actuated to be brought into a neutral position.

The invention also proposes a manufacturing apparatus for the manufacture of a composition comprising a mixing machine comprising a support defining a receiving housing, the receiving housing comprising a first receiving location configured to receive a first deformable capsule and a second receiving location configured to receive a second deformable capsule, the first and second capsules being intended to be fluidly linked to each other and containing respectively a first formulation and a second formulation, the mixing machine comprising at least one actuation system configured to transmit a pressure force to the first and second capsules in order to move the content of the first capsule in the second capsule, and vice versa, the manufacturing apparatus comprising a heater element configured to heat at least one of the first and second capsules when the first and second capsules are received in the mixing machine, characterized in that the manufacturing apparatus is configured to implement the mixing method as described above.

In one embodiment, the manufacturing apparatus comprises a receiving device configured to receive the first capsule and the second capsule, the receiving device being able to be inserted into the receiving housing.

PRESENTATION OF THE FIGURES

Other characteristics, aims and advantages of the invention will emerge from the following description, which is purely illustrative and not limiting, and which should be read in relation to the appended drawings.

FIG. 1A is a perspective view of a manufacturing apparatus, with the mixing machine and the receiving device not inserted, according to one embodiment of the invention.

FIG. 1B is a view similar to FIG. 1A, with the receiving device inserted, according to one embodiment of the invention.

FIG. 2A is a 3D view of a receiving device according to one embodiment in accordance with that of FIG. 1A, with capsules substantially in position before insertion.

FIG. 2B is a sectional view of a receiving device and of capsules, similar to those of FIG. 2A.

FIG. 3A is an exploded 3D view of a receiving device according to one embodiment in accordance with that of FIG. 1A, with capsules positioned facing their respective receiving location.

FIG. 3B is similar to FIG. 3A, with about a 90° rotation of each part on itself.

FIG. 4A is a profile view (of the connection face) of a receiving device according to one embodiment in accordance with that of FIG. 1A, with the capsules inserted.

FIG. 4B is similar to FIG. 4A, with a 180° rotation about the longitudinal axis X.

FIG. 5 is a partially exploded 3D view of a receiving device according to one embodiment in accordance with that of FIG. 1A.

FIG. 6 is a partial 3D view of the mixing machine according to one embodiment in accordance with that of FIG. 1A, representing particularly the actuation system and the actuation motor.

FIG. 7A is a top view of the mixing machine according to one embodiment in accordance with that of FIG. 1A.

FIG. 7B is a bottom view of the mixing machine according to one embodiment in accordance with that of FIG. 1A, with the battery visible.

FIG. 8A is a partial top view of the manufacturing apparatus with the mixing machine and the receiving device, in neutral position for the insertion and the withdrawal of the receiving device, with a schematic illustration of the actuation strokes.

FIG. 8B is a partial top view of the manufacturing apparatus with the mixing machine and the receiving device, with an actuation system in the middle of the actuation stroke.

FIG. 8C is a partial top view of the manufacturing apparatus with the mixing machine and the receiving device, with an actuation system at the end of actuation stroke.

FIG. 9 is a top view of the mixing machine according to one embodiment in accordance with that of FIG. 1A, representing particularly the actuation system, the actuation motor, and the link for the driving of the actuation system, and where the actuation system is in an extreme actuation stroke position.

FIG. 10A is a partial 3D view of the mixing machine, to illustrate the retention mechanism, the clamping mechanism and the coupling mechanism, in the insertion position.

FIG. 10B is a more accurate partial 3D view of the mixing machine, to illustrate the retention mechanism, the clamping mechanism and the coupling mechanism, in the insertion position.

FIG. 100 is a more accurate partial 3D view of the mixing machine, to illustrate the retention mechanism and the coupling mechanism, in the retention and coupling position.

FIG. 10D is a partial 3D view of the manufacturing apparatus, to illustrate the retention mechanism and the coupling mechanism, in the insertion position.

FIG. 10E is a partial 3D view of the manufacturing apparatus, to illustrate the retention mechanism and the coupling mechanism, in the retention and coupling position.

FIG. 10F is an exploded view of the clamping mechanism, of the retention mechanism and of the coupling mechanism.

FIG. 11A is a partial 3D view of the mixing machine with the first capsule, to illustrate the clamping mechanism, in the insertion position.

FIG. 11B is similar to FIG. 11A, viewed from another angle, except that some parts have been withdrawn for more visibility.

FIG. 11C is similar to FIG. 11A, except that other parts have further been withdrawn, in the clamping position.

FIG. 12 is a partial 3D view of the mixing machine, showing one embodiment of the printed circuit with a controller/processor and a memory.

DETAILED DESCRIPTION

FIGS. 1A and 1B represent a manufacturing apparatus 2, according to a first embodiment of the invention, configured to manufacture a composition, which can be for example a cosmetic product, a hair care product, a pharmaceutical product, a phytosanitary product, a maintenance product, a cleaning product or an agri-food product. When the composition to be manufactured is a cosmetic product, the latter can for example be a homogenized emulsion, a homogenized solution or a mixture of several miscible phases.

The manufacturing apparatus 2 is mainly for personal use and on a small scale: it allows the preparation of single section ready to use.

Consequently, its dimensions must meet space requirement constraints in a bathroom, a beauty salon, luggage (for transport), etc. Thus, the manufacturing apparatus 2 does not have a dimension greater than 40 cm.

The manufacturing apparatus 2 comprises receiving means configured to receive first and second capsules 3, 4, also called pods or packaging units, containing respectively a predetermined amount of a first formulation and a predetermined amount of a second formulation, and a mixing machine 6 configured to mix the first and second formulations contained in the first and second capsules 3, 4 received in the manufacturing apparatus 2, so as to obtain a cosmetic product.

The mixing machine 6 comprises a receiving housing forming part of the receiving means, and which are provided to receive the first and second capsules 3, 4, directly or through a specific receiving device 5.

In one preferred embodiment and particularly visible in all FIGS. 1A, 1B, 7A, 8A, 8B, 8C, the mixing machine 6 comprises a receiving housing 32 able to receive a receiving device 5 in a removable manner. The receiving housing 32 has in this case a shape substantially complementary to that of the receiving device 5.

The mixing machine 6 further comprises an actuation system 35 configured to exert a force on the first and second capsules 3, 4, via the receiving device 5 where appropriate, to allow the mixing and the kneading of the composition to be manufactured.

The receiving device 5, also called shuttle (because it serves as a vehicle for the first and second capsules 3, 4), has preferably a relatively symmetrical shape, either rectangular parallelepiped or oval/ovoid shape. A longitudinal direction X is defined, which corresponds to the direction along which it is inserted into the receiving housing 32. Consequently, the longitudinal direction X and the insertion direction are coincident when the receiving device 5 is inserted into the mixing machine 6.

Advantageously, the mixing machine 6 is configured to mix the first and second formulations inside the receiving device 5, and preferably inside the first and second capsules 3, 4, without any of the formulations coming into contact with the manufacturing apparatus 2.

As indicated above, some embodiments presented here are applicable to a manufacturing apparatus 2 without receiving device 5 i.e. with first and second capsules 3, 4 directly positionable in the mixing machine.

Advantageously, the first formulation is a first phase of a cosmetic product to be manufactured, such as a fatty phase of the cosmetic product, while the second formulation is a second phase of the cosmetic product, such as an aqueous phase of the cosmetic product. For example, the fatty phase can constitute the basis of the cosmetic product to be manufactured, and the aqueous phase can comprise active elements and thus constitute a complex of active ingredients of the cosmetic product to be manufactured.

The Capsules

The two capsules that can be used in the presented manufacturing apparatus 2 are described in detail in the document filed under the application number FR 1755744 and whose description content relating to the capsules is fully integrated here.

The capsules as such are not the object of the present invention. The following points will be retained for the remainder of the description.

As shown more particularly in FIGS. 2A, 2B, 3A, 3B, 4A, 4B, the first and second capsules 3, 4 are distinct from each other, and are configured to be fluidly linked to each other. In addition, each of the first and second capsules 3, 4 is advantageously for single use.

The first capsule 3 includes a first deformable compartment 3.1, with a bulging shape, containing the first formulation, a first connection portion 3.2 and a first linking passage 3.3 configured to fluidly link the first deformable compartment 3.1 and the first connection portion 3.2. Advantageously, the first linking passage 3.3 is formed by a first linking channel. The first connection portion 3.2 includes more particularly a female connection end-piece 3.4, for example of cylindrical shape, fluidly linked to the first linking passage 3.3. The first capsule 3 comprises a planar face 3.7 through which the connection portion 3.2 passes.

The first capsule 3 further includes an outlet passage 3.5, such as an outlet channel, which is fluidly linked to the first linking passage 3.3, and which is provided with an outlet orifice 3.6. Advantageously, the outlet passage 3.5 extends in the extension of the first linking passage 3.3, and substantially parallel to the first linking passage 3.3. In the present case, the outlet passage 3.5 can be equally mounted on the first capsule 3 or on the second capsule 4. Indeed, the outlet passage 3.5 is operatively loaded only once the manufacturing apparatus 2 has been used.

The second capsule 4 includes a second deformable compartment 4.1, with bulging shape, containing the second formulation, a second connection portion 4.2 configured to be connected to the first connection portion 3.2, and a second linking passage 4.3 configured to fluidly link the second deformable compartment 4.1 and the second connection portion 4.2. Advantageously, the second linking passage 4.3 is formed by a second linking channel, and the second connection portion 4.2 extends substantially perpendicularly to the second linking passage 4.3. The second connection portion 4.2 includes more particularly a male connection end-piece 4.4, for example of cylindrical shape, fluidly linked to the second linking passage 4.3 and configured to receive the female connection end-piece 3.4 in a sealed manner. The second capsule 4 comprises a planar face 4.7 through which the second connection portion 4.2 passes.

The first and second capsules 3, 4 and more particularly the first and second deformable compartments 3.1, 4.1 are each closed by link welds ensuring the sealing of the first and second capsules 3, 4, these link welds being breakable as soon as a threshold pressure is reached. These threshold pressures can be reached in the mixing machine 6. Again, these link welds are described in detail in the description of the document filed under the application number FR 1755744.

Each of the first and second capsules 3, 4 is configured to contain an entire or substantially an entire mixture formed by the predetermined amount of the first formulation and the predetermined amount of the second formulation. In this regard, either the deformable compartments are flexible, or buffer areas are provided. Again, the description of the document filed under the application number FR 1755744 describes that specifically.

The Receiving Device

As shown more particularly in FIGS. 2A, 2B, 3A, 3B, 4A, 4B and 5, the receiving device 5 is able to occupy an open position in which the first and second capsules 3, 4 are able to be introduced into the receiving device 5, and a closed position in which the receiving device 5 is able to hold in position the first and second capsules 3, 4.

The receiving device 5 more particularly takes the form of a receiving case 7 (FIGS. 2A, 2B) configured to receive and house at least partly the first and second capsules 3, 4. The receiving device 5 includes in particular a first protective shell 8 and a second protective shell 9 mounted articulated relative to each other about an articulation axis 10 (or hinge) and between a first position (see FIGS. 2A, 2B, 5) corresponding to an open position of the receiving device 5 and a second position (see FIGS. 4A, 4B) corresponding to a closed position of the receiving device 5. The receiving device 5 further includes a first support portion 11 and a second support portion 12 both disposed in the receiving case 7. The first and second support portions 11, 12 include respectively a first receiving location 13 configured to receive the first capsule 3 and a second receiving location 14 configured to receive the second capsule 4. The first and second protective shells 8, 9 each include an aperture 8.2, 9.2 to allow access to the first or second receiving location 13, 14. These apertures 8.2, 9.2 define an insertion face of the receiving device 5. The receiving device 5 comprises a withdrawal face, opposite to the insertion face.

Advantageously, the first support portion 11 includes receiving wedges 15 configured to receive a peripheral section of the first capsule 3, and the second support portion 12 includes for its part receiving wedges 15 configured to receive a peripheral section of the second capsule 4. These receiving wedges 15 partly define the first and second receiving locations 13, 14.

The first support portion 11 comprises a first placing surface 11.1, configured to guide (with contact) and receive the planar face 3.7 of the first capsule 3. The first placing surface 11.1 therefore partly defines the first receiving location 13.

Likewise, the second support portion 12 comprises a second placing surface 12.1, configured to guide (with contact) and receive the planar face 4.7 of the second capsule. The placing surface 12.1 therefore partly defines the second receiving location 14.

When the first and second capsules 3, 4 are inserted, their respective planar faces 3.7, 4.7 face each other, with the two placing surfaces 11.1, 12.1 therebetween.

In order to authorize the passage of the first and second connection portions 3.2, 4.2 of the first and second capsules 3, 4, the first and second placing surfaces 11.1, 12.1 each comprise a passage aperture 11.2, 12.2, in the form of a slot, open outwardly, along an insertion axis X (FIG. 1A).

The receiving device 5 further comprises a partition wall 22, defining a parting plane (FIGS. 3A, 3B). The partition wall 22 is located between the first and second receiving locations 13, 14. It is moreover secured to the first support portion 11. The partition wall 22 comprises a passage aperture 22.2 in order to allow the first and second connection portions 3.2, 4.2 to be positioned in the receiving device. The passage aperture 22.2 is in the form of an outwardly open through slot across the thickness.

The apertures 11.2, 22.2, 12.2 therefore form a space for receiving the connection end-pieces 3.4, 4.4 of the first and second capsules 3, 4.

A first actuation face 8.1 which comprises the first shell 8 and the first support portion 11 and a second actuation face 9.1 which comprises the second shell 9 and the second support portion 12 are furthermore defined.

Each actuation face 8.1, 9.1 participates in the transmission of the forces received by the receiving device 5 towards the first and second capsules 3, 4. This will be explained in detail below.

Articulation

According to the embodiment visible in FIGS. 2A, 2B, 3A, 3B, 5, the first and second shells 8, 9 are articulated relative to each other about the articulation axis 10 and between a receiving position (see FIGS. 2A, 2B, 3A, 3B) in which the first and second shells 8, 9 are distant from each other and the first and second capsules 3, 4 are able to be received respectively in the first and second receiving locations 13, 14, and a connection position (see FIGS. 4A, 4B) in which the first and second shells 8, 9 are brought together and the first and second capsules 3, 4 are pre-connected to each other. By pre-connected to each other is meant that the male connection end-piece 4.4 of the second capsule 4 is partially introduced into the female connection end-piece 3.4 of the first capsule 3 without however a sealed connection being established between these first and second capsules 3, 4.

The first and second shells 8, 9 may for example have an angle of inclination greater than or equal to 7°, and for example of about 7°, when they are in the receiving position, and be substantially parallel relative to each other when they are in the connection position. More specifically, there are only two main assemblies articulated relative to each other: the first shell 8, the first support portion 11, the partition wall 22 and the second support portion 12 on the one hand; and the second shell 9, on the other hand.

Advantageously, the first and second shells 8, 9 (or the actuation faces 8.1, 9.1) are configured to engage the first connection portion 3.2 in the second connection portion 4.2 when the receiving device 5 is moved in the closed position. Indeed, when the first and second shells 8, 9 are in the closed position, the connection portions 3.2, 4.2 are partially interlocked with each other.

The first and second support portions 11, 12 are more particularly configured such that the first and second capsules 3, 4 extend substantially parallel to each other, when the first and second shells 8, 9 are in the connection position. As shown in FIGS. 4A, 4B, the first capsule 3 is configured to extend partly outside the receiving device 5 when it is received in the receiving device 5 and when the latter is in the closed position. Advantageously, the outlet orifice 3.6 is configured to extend outside the receiving device 5 when the first capsule 3 is received in the receiving device 5 and when the latter is in the closed position.

The Heating Element

The manufacturing apparatus 2 comprises a heating element 46 (also called "heater element") visible in FIGS. 3A, 3B. In the embodiment illustrated in the figures, the heating element 46 is part of the receiving device 5. However, in the absence of the receiving device 5, the latter could be integrated into the mixing machine.

The heating element 46 is attached to the partition wall 22. During the design, it has been chosen that the heating element 46 is on the side of the first support portion 11, which means that the heating element 46 is mounted on the side of the partition wall 22 which is on the side of the first support portion 11.

The heating element 46 comprises preferably one or more electric heating resistors 46.1 and a diffusion plate 46.2. The heating element 46 has thus a planar shape to better diffuse heat, if possible with a surface area of at least 500 $mm^2$ and preferably on the order of 800 $mm^2$.

However, as the first support portion 11 lies between the first capsule 3 and the heater element 46, a communication aperture 46.3 is provided in the first support portion 11 putting in direct communication the planar face 3.7 of the first capsule 3 with the heating element 46 (i.e. separated only by air).

The Electrical Contact Tracks of the Heating Element

The heating element 46 needs to be supplied with electricity. Preferably, the receiving device 5 does not include its own battery and must be powered when it is inserted into the receiving housing 32.

Consequently, an electrical connection is provided between the receiving device 5 and the mixing machine 6.

The receiving device 5 comprises the insertion face where the apertures 8.2, 9.2 are located and which is the face that first enters the receiving housing 32, and an opposite withdrawal face which is the visible face when the receiving device 5 is inserted into the receiving housing 32. The receiving device 5 further comprises a first actuation face 8.1 and a second opposite actuation face 9.1.

Finally, the receiving device 5 comprises a first connection face 23 and a second connection face 24, preferably opposite to each other. In the embodiment illustrated in FIGS. 2A, 2B, 3A, 3B, 4A, 4B, the connection faces 23 and 24 correspond to side faces of the heating element 46 and are therefore distinct from the first and second actuation faces 8.1, 9.1 and from the insertion/withdrawal faces.

The connection faces 23, 24 extend between the actuation faces 8.1, 9.1 of the receiving device 5. Preferably, the connection faces 23, 24 link together the actuation faces 8.1, 9.1 of the receiving device 5, i.e. they are contiguous.

The general shape of the receiving device 5 is chosen so that the connection faces 23, 24 are more spaced from each other than the actuation faces 8.1, 9.1 (and than the insertion/withdrawal faces). In other words, if the smallest parallelepiped into which the receiving device 5 is inserted is considered, the faces that touch the connection faces 23, 24 are more distant than the faces that touch the actuation faces 8.1, 9.1 and are closer than the faces that touch the insertion/withdrawal faces. This results in the fact that the receiving device 5 is wider than it is thick (and moreover it is higher than it is wide).

The first connection face 23 comprises a first electrical contact track 23.1 intended to supply the heater element 46 and the second connection face 24 comprises a second electrical contact track 24.1 also intended to supply the heater element 46 (FIGS. 2A, 3A, 3B, 4A, 4B). The electrical contact tracks 23.1, 24.1 are therefore outside the receiving device 5, in order to be put into contact with complementary tracks (FIGS. 2A, 4A, 4B).

This configuration has several advantages: first, it ensures a simple and efficient electrical connection. It also avoids the risks of short circuit. Indeed, in case there is liquid running in the receiving housing 32 (for example shower or sink water or simply a capsule that bursts), it is unlikely that the two electrical contact tracks 23.1, 24.1 are affected at the same time by the same liquid volume.

The first connection face 23 comprises a section of the first and second shells 8, 9, of the first support portion 11 and of the partition wall 22.

Particularly, the first connection face 23 comprises a longitudinal groove 23.2 with a bottom 23.21 and two side walls 23.22, 23.23. The first electrical contact track 23.1 is preferably positioned on the side wall 23.22 of the longitudinal groove 23.2. In the embodiment illustrated in FIGS. 3A, 3B, the bottom 23.21 and the side wall 23.23 are made by a section of the first support portion 11. A suitable cutout 8.5 is then provided in the first shell 8 to leave room for the longitudinal groove 23.2. The opposite side wall 23.22 is made by a section of the partition wall 22. The first electrical contact track 23.1 is then positioned on this side wall 23.22 (because the heater element 46 is mounted on the partition wall).

Likewise, a similar longitudinal groove 24.2 is provided on the second connection face 24, with a cutout 9.5 in the second shell 9 and a bottom 24.21 and two opposite side walls 24.22, 24.23. Due to the non-centering of the grooves, the cutout 9.5 in the second shell 9 is significantly less marked than the cutout 8.5 in the first shell 8.

The grooves 23.2, 24.2 are configured to engage respective complementary rails 31.1, 31.2 (slide link) provided in the receiving housing 32 on connection (preferably opposite) sides (FIGS. 1A, 7A). Consequently, the grooves 23.2, 24.2 form reliefs which extend over the entire height of the section of the receiving device 5 where they are located—at least up to the insertion height. The complementary rails 31.1, 31.2 contribute to defining the receiving housing 32 and are positioned on opposite edges.

In one embodiment visible in FIGS. 4A, 4B in particular, the electrical contact tracks 23.1, 24.1 are not located at the same level, but are offset.

The electrical contact tracks 23.1, 24.1 can take several forms: electrical pins, metal leafs (as illustrated), etc. The electrical contact tracks 23.1, 24.1 are preferably slightly deformable to ensure permanent contact when the receiving device 5 is placed in the receiving housing 32.

It is thus noticed that the longitudinal grooves 23.2, 24.2 are not centered relative to the first and second actuation faces 8.1, 9.1 (see in particular FIGS. 2A, 4A, 4B). In terms of design, this results in a groove essentially formed in the first support portion 11 and the first protective shell 8.

The interest in this dissymmetry lies in a foolproof function. It is indeed impossible to put the receiving device 5 in the wrong direction (according to a 180° rotation about the longitudinal axis X) because the grooves 23.2, 24.2 would not fit into the rails 31.1, 31.2 and the second shell 9 would come into abutment against them.

In order to have a foolproof effect for a vertical rotation (i.e. by trying to put the withdrawal face at first, instead of the insertion face), the longitudinal grooves 23.2, 24.2 do not extend over the entire height of the section of the first or second shell 8, 9 where they are located. Consequently, without necessarily providing a specific part, an abutment effect is obtained simply by the non-through portion of the first or second shell 8, 9 by the relief effect. In other words, the first or second shell 8, 9 prevents the insertion of the grooves 23.2, 24.2 on the rails 31.1, 31.2 when the receiving device 5 is in the wrong direction.

In addition, the longitudinal grooves 23.2, 24.2 each comprise an end abutment 23.3, 24.4, located on the side of the withdrawal face. These end abutments 23.3, 24.4 act as an insertion abutment, to define a maximum insertion position in the receiving housing 32.

In reality, it has two different types of abutments, but they are located substantially in the same place: at the end of the longitudinal grooves 23.2, 24.2.

The Electrical Contact Tracks of the Temperature Sensor

The first support portion 11 is favored over the second support portion 12 to bear a wall 23.23, 24.23 of the groove 23.2, 24.2, because of the heater element 46 which is intended to mainly heat the first capsule 3.

Indeed, a temperature sensor (not visible in the figures) is adjoined to the rear face of the diffusion plate 46.2 in order to measure the temperature prevailing in the vicinity of the first receiving location 13 and therefore of the first capsule 3. The temperature sensor is therefore preferably arranged in the receiving device 5, but it could be also integrated directly into the mixing machine 6, in particular when no receiving device 5 is provided.

The temperature sensor is typically a NTC (Negative Temperature Coefficient) thermistor, but could also be an infrared temperature sensor or a thermocouple.

This temperature sensor must also be electrically connected to the mixing machine 6 (particularly ultimately the processor, to recover the data) and to a battery 44 equipping the mixing machine 6, to power it.

To this end, a first additional electrical contact track 46.51 is provided at the level of the first contact face 23. This first additional electrical contact track 46.51 is distinct from the first electrical contact track 23.1. More specifically, the first additional electrical contact track 46.51 is provided in the first groove 23.2, on the side wall 23.23, i.e. the side wall formed by the first support portion 11.

Similarly, a second additional electrical contact track 46.52 is provided in the second groove 24.2.

The two additional electrical contact tracks 46.51, 46.52 are also advantageously offset. In a specific example, the additional electrical contact track 46.51 and the electrical contact track 24.1 are at the same level and the additional electrical contact track 46.52 and the electrical contact track 23.1 are at the same level.

FIGS. 2A, 3A, 3B, 4A, 4B, 5 illustrate these tracks.

An additional temperature sensor (not represented) could be provided in the receiving device 5 or directly in the mixing machine 2 in order to measure the room temperature, preferably continuously. This additional temperature sensor would thus allow adjusting the measurement threshold of the temperature sensor described above, in particular in order to have an even more reliable measurement of the temperature of the content of the capsules.

The Foolproof

The receiving device 5 includes a foolproof 17 to ensure that the first and second capsules 3, 4 are correctly positioned, i.e. the "right" capsules 3, 4 are put in the "right" receiving locations 13, 14 (clearly visible in FIGS. 2A, 5). The foolproof 17 is preferably located at the end of the passage apertures 11.2, 12.2, to block the unwanted passage of an unwanted connection end-piece 3.2, 4.2.

The foolproof 17 comprises at least one flap 17.1 opening outwardly of the receiving device 5 (preferably two, on each side as illustrated in the figures; preferably, the two flaps 17.1 have a saloon configuration, i.e. articulated by hinges outwardly of the receiving device 5).

Particularly, the foolproof 17 fulfills two distinct roles.

The flap 17.1 comprises an aperture 17.2 of a shape complementary to the female connection end-piece 3.4 of the first capsule 3 in order to authorize its insertion into the aperture 8.2. In addition, the flap 17.1 comprises an abutment 17.3, which contributes to defining the aperture 17.2, in order to prevent the insertion into the aperture 8.2 of the second connection portion 4.2, which is longer transversely than the first connection portion 3.2. Indeed, there is an attempt to insert the second capsule 4 into the first receiving location 13, the end of the second connection portion 4.2, i.e. a portion of the male connection end-piece 4.4 bangs into the abutment 17.3.

For accessing the second receiving location 14, the foolproof 17 blocks it when the receiving device 5 is in the closed position: the passage aperture 12.2 is blocked, preferably by the abutment 17.3 as well. On the other hand, when the receiving device 5 is in the open position, i.e. the second shell 9 has rotated on its hinge, the passage aperture 12.2 is released.

Finally, since the flap 17.1 opens outwardly, it is functionally non-blocking during the extraction of the first and second capsules 3, 4 (both at the same time, as they are attached) from the receiving device 5.

The foolproof 17 can be attached to the first support portion 11 or to the second support portion 12 (as in the figures), depending on the design of the relative motion of the parts: if the second support portion 12 is attached to the second shell 9 (and therefore movable in rotation relative to the first support portion 11), then it is preferable to attach the foolproof to the first support portion 11. In other words, this is irrelevant.

Return springs 17.4 hold the foolproof 17 in the default, i.e. closed, position.

The Bearing Elements—the Vanes

As shown in particular in FIGS. 2B, 3A, 3B, the receiving device 5 further includes a first bearing element 19 configured to penetrate inside the second receiving location 14, i.e. to exert a pressure force on the first capsule 3, and more particularly on the first deformable compartment 3.1, and a second bearing element 21 configured to penetrate inside the first receiving location 13, i.e. to exert a pressure force on the second capsule 4, and more particularly on the second deformable compartment 4.1.

The first bearing element 19 (respectively the second bearing element 21) is preferably mounted on the first support portion 11 (respectively the second support portion 12) and is movable between an inactive position, or called deployed position, in which the first or second receiving location 13, 14 is accessible for the first or second capsule 3, 4 (see FIG. 2B, 3A, 3B) and an active position or called folded position, in which the first bearing element 19 (respectively the second bearing element 21) penetrates inside the first receiving location 13 (respectively the second receiving location 14), i.e. it is able to exert a pressure force on the first deformable compartment 3.1 of the first capsule 3 (respectively the second deformable compartment 4.1 of the second capsule 4).

The first bearing element 19 (respectively the second bearing element 21) is advantageously movably mounted in rotation about a hinge 19.1 (respectively the hinge 21.1). The hinge 19.1 (respectively the hinge 21.1) is located opposite the aperture 8.2 (respectively the hinge 8.1) of the first shell 8 (respectively the second shell 9). The hinges 19.1, 21.1 are therefore both located in the vicinity of the withdrawal face of the receiving device 5.

The bearing elements 19, 21 each have a planar inner face 19.2, 21.2 to form vanes movable in rotation. Each planar inner face 19.2, 21.2 cooperates with its respective first or second capsule 3, 4. As the bearing elements are pressed, the volume between the vane and the placing surface 11.1, 12.1 gradually and continuously decreases. When the first or second capsule 3, 4 is installed, the outlet orifice 3.6 and the connection portions 3.2, 4.2 are located on the side opposite to the hinge 10: this allows effectively expelling the cream from the first or second capsule 3, 4 while avoiding any unwanted retention area thereinside.

To hold the bearing elements 19, 21 in the open position by default (i.e. when the receiving device 5 is not actuated or when the second shell 9 is in the pivoted position), return means 21.3, as springs, are provided, bearing against the first or second shell 8, 9 (FIG. 5). The return means 21.3 may tend to push the vane which slightly extends on the other side of the hinge 21.1.

In use, as will be described thereafter, the two bearing elements 19, 21 are activated successively to allow the kneading of the cream. The cream then passes from a first or second capsule 3, 4 to the other second or first capsule 4, 3.

Preferably, to optimize the operation of the vane, the hinge 19.1 (respectively the hinge 21.1) defines an axis of rotation comprised in the plane of the placing surface 11.1 (respectively the placing surface 12.1) and orthogonal to the longitudinal axis of the receiving device 5. In the absence of a capsule, the inner face 19.2, 21.2 can be pressed against the placing surface 11.1, 12.1.

Likewise, the hinge 19.1, 21.1 is preferably located just at the end of the first or second receiving location 13, 14.

In order to move the bearing elements 19, 21, the first and second shells 8, 9 each comprise, preferably facing the extreme portion of the vane (to take advantage of the leverage effect and minimize the force to be applied), a bearing point 8.3, 9.3, configured to receive an external force, described in more detail later. The bearing point 8.3, 9.3 is attached to a flexible area 8.4, 9.4, (made of elastomer, etc.) which can deform. The flexible area 8.4, 9.4 is itself attached to the rest of the first or second shell 8, 9, made of a more rigid plastic.

The bearing point 8.3, 9.3 is made of a rigid material (typically plastic).

Alternatively (not illustrated), the first and second shells 8, 9 have two orifices, preferably facing the extreme portion of the vane, in order to allow free access to the bearing elements 19, 21.

A user can, with one hand, grasp the receiving device 5 and press the bearing points 8.4, 9.4 simultaneously, for example with the thumb and forefinger/middle finger. A simultaneous pressure allows directing the cream from the first and second capsules 3, 4 towards the outlet orifice 3.6.

In another embodiment, not illustrated, where the receiving device 5 is integrated into the mixing machine 6, the vanes can be directly integrated into the mixing machine 6.

The Retention Abutment

In order to prevent the receiving device 5 from being withdrawn from the receiving housing 32 when the mixing method is in progress, a retention mechanism 50, described in detail later, is provided in the manufacturing apparatus 2. For the retention mechanism 50 to have a grip on the receiving device 5, a retention abutment 9.6 is provided on one of the first or second shells 8, 9 (the second shell 9 in FIGS. 2A, 2B, 3A, 3B, 4B, 5). This retention abutment 9.6 essentially corresponds to a protrusion extending radially, i.e. in a plane orthogonal to the longitudinal direction X. It can be found at any location along the height of the receiving device 5. In the illustrated exemplary embodiment, the retention abutment 9.6 is disposed in the vicinity of the insertion face.

Another abutment can be provided on the other shell, for ergonomic reasons for example.

The Grip Handles

In order to allow the user to catch the receiving device 5 when it is inserted into the receiving housing 32, grip handles 8.7, 9.7 are provided on each of the first and second protective shells 8, 9 (visible in particular in FIGS. 1, 2B, 4A, 4B). These grip handles 8.7, 9.7 are located at the level of the withdrawal face, which is the one accessible when the receiving device 5 is in place.

The grip handle 8.7, 9.7 may simply consist of a protrusion extending radially, i.e. in a plane orthogonal to the longitudinal direction X, sufficiently long so that part of the user's phalanx can pull it.

The Coupling Button

As indicated above, the actuation faces 8.1, 9.1, and more specifically the first and second protective shells 8, 9 each include a bearing point 8.3, 9.4, to transfer the force towards the bearing elements 19, 21 inside. These bearing points 8.3, 9.4 are formed in a flexible area 8.4, 9.4.

When the receiving device 5 switches into the closed position, the connection end-pieces 3.4, 4.4, face each other and interlock partially.

To create a sealed and reliable fluid communication between the first and second capsules 3, 4, a coupling mechanism 52 is provided in the manufacturing apparatus 2. This coupling mechanism 52 exerts a force in the direction of the receiving device. 5. This coupling mechanism 52 allows both establishing the fluid connection between the first and second capsules 3, 4 under the effect of the force exerted by the coupling mechanism 52 but also avoiding any unwanted disconnection of the first and second capsules 3, 4 under the effect of the pressures generated by the kneading of the first and second capsules 3, 4. It will be described below.

One of the first or second protective shells 8, 9 (or both), comprise(s) a coupling button 9.8, movable in the direction of the second receiving location 14 (FIGS. 2A, 2B, 3A, 3B, 4A, 4B, 5). More specifically, it is movable in the direction of an area close to the aperture 9.2, since the coupling button 9.8 is intended to press the second capsule 4 in the vicinity of the connection section 4.2. In this regard, the coupling button 9.8 is attached to a flexible area, which may be the flexible area 9.4 of the bearing point 9.3. It is noted here that the coupling button 9.8 is distinct from the bearing point 9.3.

The coupling button 9.8 is preferably rigid to better transmit the force of the coupling mechanism 52 to the first and second capsules 3, 4, which are therefore maintained coupled.

The Mixing Machine

As shown more particularly in FIGS. 6, 7A, 7B, 8A, 8B, 8C, 9, 10A, 11A, 11B, 11C, the mixing machine 6 includes a support 31, and a receiving housing 32 defined at least partly by the support 31 and configured to receive at least part of the receiving device 5. According to the embodiment represented in FIGS. 1A, 1B, the mixing machine 6 and the receiving device 5 are configured such that the receiving device 5 extends at least partly outside the mixing machine 6, when the receiving device 5 is received in the receiving housing 32.

The support 31 behaves like a base, i.e. it defines a set of fixed elements when the mixing machine 6 is laid on a support (table, worktop, etc.), regardless of whether it is in use or not. The support 31 of the mixing machine 6 also includes an outer shell 33 and an insertion aperture 34 opening out into the receiving housing 32, the receiving device 5 being configured to be inserted into the receiving housing 32 through the insertion aperture 34. Advantageously, the insertion aperture 34 is arranged in a central section of an upper surface of the base 33, and is configured to be oriented upwardly when the mixing machine 6 is disposed on a horizontal support surface (table, worktop, etc.).

The base 33 also serves as an external casing, with the desired design for the mixing machine. The base 33 may comprise a lower base and an upper base.

The Actuation System

The mixing machine 6 further includes an actuation system 35 pivotally mounted on the support 31 about a substantially vertical pivot axis 36 when the mixing machine 6 is disposed on a horizontal support surface (table, worktop, . . . ) (FIGS. 6, 8A, 8B, 8C, 9, 10A).

Preferably, the actuation system 35 performs back-and-forth motions about the pivot axis 36 along a maximum angular displacement of 45°. The motion is therefore composed of a rotation at +maximum 45° C. then a rotation at −45°, and so on. Its movement takes place along a nominal stroke C35 (not represented in the figures), which, in the case of rotation about the pivot axis 36, is associated with the maximum angular displacement. The nominal stroke C35 of the actuation system 35 is defined as the stroke between two extreme positions of said actuation system 35. A neutral position of the actuation system 35 is defined between these two extreme positions, the neutral position of the actuation system 35 corresponding to an insertion position in which the receiving device 5 can be positioned inside the receiving housing 32 of the mixing machine 6 without being hampered by the actuation system 35.

The mixing machine 6 further includes a drive motor 39 mounted on the support 31. The drive motor 39 is configured to pivot the actuation system 35 about the pivot axis 36 and within a predetermined angular range. Preferably, the drive motor 39 rotates only in one direction.

The actuation system 35 includes a first actuation member 37, which may comprise a first actuation finger 37.1, configured to transmit a pressure force to the first capsule 3, and a second actuation member 38, which may comprise a second actuation finger 38.1, opposite to the first actuation member 37 and configured to transmit a pressure force to the second capsule 4.

The first and second actuation members 37, 38 are configured to be disposed on either side of the receiving housing 32 and therefore of the receiving device 5 when the latter is received in the mixing machine 6, and more specifically in the receiving housing 32.

The actuation members 37, 38 have at least one position in which they are at least partially inside the receiving housing 32. In the neutral position of the actuation system 35, the actuation members 37, 38 are arranged relative to the receiving housing 32 so as to allow the receiving device 5 to be positioned inside the receiving housing 32 of the mixing machine 6; it is the insertion position.

The first and second actuation members 37, 38 are more particularly configured to exert pressure forces respectively and alternately on the first and second bearing elements 19, 21, so as to transmit pressure forces respectively and alternately on the first and second compartments 3.1, 4.1. Particularly, the first and second actuation members 37, 38 are configured to cooperate respectively with the first and second bearing points 8.3, 9.3 of the first and second protective shells 8, 9, or directly on the bearing elements 19, 21.

An actuation stroke C37 is defined for the first actuation member 37 and an actuation stroke C38 for the second actuation member 38.

The actuation stroke C37 is defined as the stroke of the first actuation member 37 between the neutral position of the actuation system 35 and the maximum actuation position of the first actuation member 37, in which the first actuation member 37 is in maximum compression on the first bearing element 19.

Conversely, the actuation stroke C38 is defined as the stroke of the second actuation member 38 between the neutral position of the actuation system 35 and the maximum actuation position of the second actuation member 38, in which the second actuation member 38 is in maximum compression on the second bearing element 21.

Preferably, the motion of the actuation system 35 can be followed using various sensors, and particularly Hall effect sensors. More specifically, each of said first actuation member 37 and second actuation member 38 may include a magnet intended to interact with a fixed Hall effect sensor. Advantageously, the Hall effect sensor can be directly disposed on a monitoring unit 45 which will be described later, as can be seen in FIG. 12. It is thus possible for the monitoring unit 45 to follow the motion of the actuation system 35, and even of each of the first and second actuation members 37, 38. It can even be envisaged, for the monitoring unit 45, to know with accuracy the position of each of the first and second actuation members within their respective actuation strokes C37, C38, for example by disposing several Hall effect sensors.

According to the embodiment represented in FIGS. 1 to 22, the first and second actuation members 37, 38 extend substantially in the same plane of extension, and converge opposite the pivot axis 36.

As illustrated in FIGS. 6, 8A, 8B, 8C, 9, the actuation system 35 has a substantially annular shape defining an aperture around the receiving housing 32. In one embodiment, the actuation system 35 is formed essentially in one piece, comprising an aperture for receiving a shaft defining the pivot axis 36.

The first actuation member 37 and the second actuation member 38 are each disposed on opposite sides of the actuation system 35. Consequently, there is an actuation system 35 extending over twice two opposite faces two by two: the actuation members 37, 38, the aperture for the pivot axis 36 and the drive mechanism with groove which is described thereafter.

The actuation members 37, 38 can each comprise a drive support 37.3, 38.3, which meet on one side at the level of the pivot axis 36. On the other side, a connection section 36.1 is defined, which links the two drive supports 37.3, 38.3. The connection section 36.1 can be attached or formed integrally with the drive supports 37.3, 38.3.

Preferably, the two actuation members 37, 38 rotate about the same pivot axis 36. In this case, two drive supports 37.3, 38.3 secured in rotation are favored.

However, it is possible to provide for a pivot axis for each of the actuation members 37, 38; however, some simple adaptations will have to be made.

Alternatively, in one embodiment, not represented, the actuation members are movable in translation.

The Springs

The actuation system 35 moves along a nominal stroke C35 to exert a force on the receiving device 5.

Nevertheless, the clearances in the kinematic chain, related to the manufacturing tolerances, can disturb the transmission of the forces by offsetting the positioning of the actuation system 35. Thus, once at the end of the stroke, it is possible that a few millimeters are missing or conversely that there are a few millimeters in excess. This can cause insufficient compression or conversely break the manufacturing apparatus 2.

To overcome that, the actuation system 35 may comprise a spring 37.4, 38.4 (particularly visible in FIGS. 8A, 8B, 8C). Particularly, the spring 37.4, 38.4 is configured to compress when the actuation system 35 reaches the vicinity of its nominal end of stroke C35 and when the actuation finger 37.1, 38.1 is in abutment against the planar face 3.7, 4.7 of the capsule. The spring 37.4, 38.4 therefore generates a force tending to move the actuation member 37, 38 apart from the receiving device 5.

More specifically, each actuation member 37, 38 comprises a spring 37.4, 38.4.

The spring 37.4, 38.4 can be located at different locations. In one embodiment, not illustrated, the spring 37.4, 38.4 is located at the "free" end of the finger 37.1, 38.1.

In another embodiment, preferred because the spring is hidden, the spring 37.4, 38.4 is mounted between the finger 37.1, 38.1 and the drive support 37.3, 38.3. In this way, the user cannot access it because the spring is behind the base.

To put the spring at this location, it is convenient to provide, for each actuation member 37, 38, an arm 37.2, 38.2, movably mounted relative to the drive support 37.3, 38.3. The finger 37.1, 38.1 is then mounted secured to the arm 37.2, 38.2.

In the embodiment illustrated in particular in FIGS. 8A, 8B, 8C, 9, the arm 37.2, 38.2 is movable in rotation relative to the drive support 37.3, 38.3 by a hinge 37.5, 38.5. The spring 37.4, 38.4 is positioned between the arm 37.2, 38.2 and the drive support 37.3, 38.3.

The spring 37.3, 38.3 therefore works in compression, in the sense that its idle position, or unstressed position, is not compressed. It is compressed in the direction of translation or rotation of the actuation member 37, 38.

The spring 37.3, 38.3 may be a helical or a leaf type spring, or it even comprises an elastic material or an elastic assembly (elastomer, gas bubble, etc.).

The Rotational Drive

According to the embodiment represented in FIGS. 6, 8A, 8B, 8C, 9, the mixing machine 6 also includes a cam 41, in the form of a drive wheel or an arm, secured in rotation to an output shaft 39.1 of the drive motor 39 and configured to be driven in rotation about its cam axis 41.1 of rotation. The cam 41 is mounted on the support 31.

To authorize the back-and-forth motion with a large lever arm, it is preferable that the pivot axis 36 and the cam 41 are on either side of the receiving housing 32.

The cam 41 is equipped with a drive finger 42 which is eccentric relative to the cam axis 41.1 of rotation.

The cam 41 is typically driven by drive motor 39 using one or more belt(s). In this case, the kinematic chain is as follows, from the drive motor 39 and its output shaft 39.1 on which a pulley is mounted: a belt 39.2, a pulley 39.3 linked to a pulley 39.4 by a shaft, a belt 39.5, the cam 41.

The drive finger 42 is received in a drive groove 43 provided on the actuation system 35. Particularly, the drive groove 43 is constructed in the connection section 36.1. The drive groove 43 is elongated and extends along a direction of extension substantially parallel to the pivot axis 36. Such a configuration of the mixing machine 6 allows obtaining a reciprocating motion of the actuation system 35 by rotating the drive motor 39 always in the same direction of rotation, so that it is not necessary to resort to an expensive control system of the drive motor 39.

The drive groove 43 extends, along its depth, in the direction of the pivot axis 36.

The link between the drive groove 43 and the drive finger 42 will now be described. Due to the rotation of the actuation member 35, the alignment of the drive groove 43 and of the drive finger 42 is variable, which means that a simple adjustment would block the system. Conversely, the presence of clearance, which would authorize the misalignment, generates noise and gives a delay time at each end of stroke.

To solve that, a ball joint is provided between the drive finger 42 and the drive groove 43, which allows managing the previous misalignment.

Particularly, a ball 42.1 which is housed in a ring 43.1 is mounted on the drive finger 42. The link between the ball 42.1 and the ring 43.1 is a ball joint. The ring 43.1 is for its part received in the drive groove 43 where it is movably mounted in translation along a direction parallel to the pivot axis 36 (therefore along the length of the drive groove 43). Finally, the ball 42.1 is movably mounted in translation along the drive finger 42.

The arrangement of these different links can be different, in that sense that the ring can also be movable in translation along the depth of the groove and the ball is then fixed on the drive finger.

Consequently, the complete link between the drive finger 42 and the actuation system 35 comprises in series a slide, a ball, a slide perpendicular to the other slide. Consequently, in a kinematic torsor, it is noted that the force is transmissible only on one of the six components of the torsor, namely that of the translation tangent to the rotational motion of the actuation system 35, i.e. the one that allows rotating the actuation system 35. The kinematic equivalent is the sphere-plane link (also called point link).

For the link described above not to be unnecessarily more complex, the cam axis of rotation 41.1 and the pivot axis 36 are preferably orthogonal. This allows having a drive finger 42 which describes a circular motion in a plane parallel to the pivot axis 36.

Some planned motions of the links can be done simply by plastic/plastic sliding, whose wear is slow enough to ensure a satisfactory service life.

According to one variant of the invention, the mixing machine 6 could be configured such that a rotation of the drive motor 39 in a first direction of rotation causes a pivoting of the actuation portion 35 in a first one pivot direction and such that a rotation of the drive motor 39 in a second direction of rotation, opposite to the first direction of rotation, causes a pivoting of the actuation portion 35 in a second pivot direction, opposite to the first pivot direction.

Decentering of the Pivot Axis

The actuation members 37, 38 each move along an actuation stroke C37, C38.

However, in the embodiment illustrated in the figures, one of the two actuation members 37, 38 has an actuation stroke C37, C38 of a length strictly greater than that of the other actuation member.

This difference in the actuation stroke C37, C38 allows better managing mechanically and electrically the force to be provided to deform the first capsule 3 relative to the second capsule 4. Indeed, as illustrated in FIG. 2B, the first capsule 3 has a thickness greater than the second capsule 4, which means that more space is needed on the side of the thickest capsule and that the bearing element 19 will be in contact more quickly and will start to work faster than the bearing element 21.

To achieve this stroke difference, several solutions can be envisaged. One solution consists in having a non-centered drive groove 43 in the connection section 36.1.

Another solution, illustrated particularly in FIGS. 8A, 8B, 8C, 9 consists in decentering the pivot axis 36. In other words, the cam axis of rotation 41.1 does not intersect the pivot axis 36. This induces a stroke difference between the two actuation members 37, 38 when the cam 41 makes a complete revolution. A distance (orthogonal, i.e. by orthogonal projection) between the cam axis of rotation 41.1 and the pivot axis 36 from 1% to 5% of the distance between the drive groove 43 and the pivot axis 36 suffices and does not disturb too much the symmetrical aspect of the assembly. In absolute terms, a distance comprised between 1 and 2 mm is suitable.

The decentering can also be defined using the receiving housing 32 relative to the axis of rotation of the cam 41: thus, the extreme positions of the actuation system 35 are not centered about the receiving housing 32.

The decentering can also be defined relative to the first and second placing surfaces 11.1, 12.1 or relative to the location of the first and second capsules 3, 4 within the receiving housing 32: using the planar faces 3.7, 4.7, which therefore define artificial planes in the receiving housing 32. The maximum distance from the first actuation member 37 to said plane of the planar face 3.7 is greater than the maximum distance from the second actuation member 38 to the planar face 4.7.

In this regard, in one variant, the pivot axis 36 is comprised in a plane located equidistant from the two placing surfaces 11.1, 12.1.

In reaction to the decentering, the first actuation finger 37.1 is advantageously longer than the second actuation finger 38.1. This is in particular due to the fact that it is necessary to compensate for the extreme position of the actuation fingers 37.1, 38.1 due to the decentering. More exactly, the actuation finger 37.1, 38.1, which works on the thickest first or second capsule 3, 4, has a greater length than the other actuation finger 38.1, 37.1.

Another solution, which is illustrated in FIG. 8A, consists in not defining the neutral position of the actuation system 35 during a top or bottom dead center of the cam 41. Indeed, by choosing the neutral position of the actuation system 35 at a non-zero angle Ag (typically Ag is comprised between 5° and 30°) relative to noon (when the mixing machine 6 is laid on a horizontal support), the distribution of the actuation strokes C37, C38 is offset. It is furthermore noted that another neutral position for an angle Ag' corresponding to Ag'=180°-Ag is obtained de facto.

Indeed, the actuation strokes C37, C38 correspond, at the level of the cam 41, to the rotation from said angle Ag up to the closest 90° rotation (i.e. 3 o'clock or 9 o'clock, when the mixing machine 6 is laid on a horizontal support) and then to the rotation from said angle Ag' up to the 270° rotation.

As Ag and Ag' are not at 0 and 180° (noon and 6 o'clock), it is immediately noticed that the strokes C37 and C38 are not equal. On a complete rotation of the cam 41, the first actuation stroke C37 has therefore been covered in a first direction then the first actuation stroke C37 in a second direction, then the second actuation stroke C38 in a first direction then the first actuation stroke C38 in a second direction, i.e. twice the nominal stroke C35.

Contact Tracks of the Mixing Machine

As mentioned previously, the mixing machine 6 also comprises electrical contact tracks 31.11, 31.12 configured to engage with the electrical contact tracks 23.1, 24.1 of the longitudinal grooves 23.2, 24.2 of the receiving device 5 and electrical contact tracks 31.51, 31.52 configured to engage with the additional electrical contact tracks 46.51, 46.52 of the longitudinal grooves 23.2, 24.2.

These electrical contact tracks are mounted on the rails 31.1, 31.2 (FIGS. 1A, 7A), which are secured to the support 31 and which are mounted on two connection sides of the receiving housing 32. The location of the electrical contact tracks 31.11, 31.12 (and also 31.51, 31.52) on the rails 31.1, 31.2 is complementary to the location of the electrical contact tracks 23.1, 24.1 (and also 46.51, 46.52) of the connection faces 23, 24 of the receiving device 5. The rails 31.1, 31.2 contribute to defining the receiving housing 32. They are for example located on the edge and are preferably fixed over their entire length to the support 31.

The location of the electrical contact tracks 31.51, 46.51 and 31.52, 46.52 on two opposite rails 31.1, 31.2, located at a distance from each other, has the advantage of limiting the risks of short-circuit in case there is liquid running by gravity on one of the rails 31.1, 31.2.

Shutter, Coupling, Withdrawal Mechanism

The mixing machine 6 further comprises a retention mechanism 50, a coupling mechanism 52 and a clamping mechanism 54 (FIGS. 10A, 10B, 10C, 10D, 10E, 10F, 11A, 11B, 11C).

Each of these mechanisms has its own and independent function. However, they can advantageously be driven simultaneously by the same auxiliary motor 40.

The retention mechanism 50 has the function of preventing the removal of the receiving device 5 when the mixing is in progress.

The retention mechanism 50 is movably mounted relative to the support 31 between an insertion position and a retention position. In the insertion position, the retention mechanism 50 allows the insertion and the withdrawal of the receiving device 5 relative to the mixing machine 6. In the retention position, the retention mechanism 50 blocks the withdrawal of the receiving device 5 (and consequently would prevent its insertion).

The retention mechanism 50 comprises a movable element 50.1 between the two aforementioned positions, which extends into the receiving housing 32 in the retention position. Particularly, in the retention position, the movable element 50.1 cooperates with the retention abutment 9.6 to prevent a translational motion of the receiving device 5 aiming to extract it from the mixing machine 6 (indeed, the retention abutment 9.6 is blocked against the movable element 50.1 in case of withdrawal). In this regard, the movable element 50.1 and the retention abutment 9.6 are provided to be located nearby in the retention position, preferably less than 2 mm, when the receiving device 5 is placed in the mixing machine.

In one embodiment illustrated in FIGS. 10A, 10B, 10C, the movable element 50.1 is a wheel, called retention wheel, movable about a wheel axis of rotation 50.2. The wheel 50.1 has at least two different spokes, the smallest spoke being configured not to extend into the receiving housing 32 in the insertion position and the largest spoke being configured to extend into the receiving housing 32 in the retention position, in order to come into contact, in case of withdrawal, against the retention abutment 9.6.

The wheel 50.1 is preferably circular with a flat section, the flat section allowing the insertion position.

The wheel 50.1 is mounted on a shaft which extends along the wheel axis of rotation 50.2. This shaft comprises a pinion 51 or a pulley, linked to at least another pinion or another pulley 51.1.

Alternatively, the movable element 50.1 is movable in translation, for example by a rack-and-pinion system by means of the pinion 51.

The coupling mechanism 52 has the function of establishing the sealed connection between the first and second capsules 3, 4 and ensuring that these capsules remain interlocked via their connection end-piece 3.4, 4.4 by pressing the coupling button. 9.8 of the second protective shell 9.

The coupling mechanism 52 is movably mounted relative to the support 31 between an insertion position and a coupling position. In the insertion position, the coupling mechanism 52 allows the insertion and the withdrawal of the receiving device 5. In the coupling position, the coupling mechanism 52 locks the first and second capsules 3, 4.

The coupling mechanism 52 comprises a coupling element 52.1 movable between the two aforementioned positions, which extends into the receiving housing 32 in the coupling position. Particularly, in the coupling position, the coupling element 52.1 cooperates with the coupling button 9.8 which moves inside the second receiving location 14. In this regard, the coupling element 52.1 and the coupling button 9.8 are located facing each other, when the receiving device 5 is placed in the mixing machine 6.

In one embodiment illustrated in FIGS. 10A, 10B, 10C, the coupling element 52.1 is a wheel, called coupling wheel, movable about a wheel axis of rotation 52.2, which is preferably coincident with the wheel axis of rotation 50.2. The wheel 52.1 has at least two different spokes, the smallest spoke being configured not to extend into the receiving housing 32 in the insertion position and the largest spoke being configured to extend into the receiving housing 32 in the coupling position, in order to come into contact with the coupling button 9.8, and to press it.

The wheel 52.1 is preferably oval-shaped in the plane.

The wheel 52.1 is mounted on a shaft which extends along the wheel axis of rotation 52.2. This shaft comprises a pinion or a pulley, linked to at least another pinion or another pulley 51.1. The shaft and the pinion are preferably the same as the shaft and the pinion 51. In this way, a first subassembly secured in rotation is obtained.

Alternatively, the coupling element 52.1 is movable in translation, for example by a rack-and-pinion system by means of the pinion 51.

The coupling mechanism 52 is distinct from the actuation system 35. This results in a different position in the mixing machine 6 (for example at different heights). Similarly, the receiving device 5 comprises many bearing points 8.3, 9.3 distinct from the coupling button 9.8.

The clamping mechanism 54 has the function of blocking the outlet passage 3.5 of the first capsule 3 when the mixing method is in progress. Indeed, the pressures inside the first or second capsule 3, 4 could cause unwanted release of the cream. In this case, cream would spill into the mixing machine 6, which is to be avoided. It is illustrated in FIGS. 11A, 11B, 11C.

The clamping mechanism 54 is movable relative to the support 31 between an insertion position and a clamping position. In the insertion position, the clamping mechanism 54 allows the insertion and the withdrawal of the receiving device 5 carrying the first capsule 3. In the clamping position, the clamping mechanism 54 clamps the outlet passage 3.5.

The clamping mechanism 54 comprises a clamping wheel 54.1, called clamping wheel, which is movable in rotation about a clamping wheel axis 54.2.

The mixing machine 6 further comprises a fixed guide wall 54.3 (secured to the support 31, even formed integrally therewith) against which the clamping wheel 54.1 rolls or slides, and a clamping wall against which it is clamped in the clamping position. The clamping wall is advantageously a section of the guide wall 54.3. There are several variants: one variant in which the clamping wheel 54.1 approaches the guide wall 54.3 in the direction of the clamping position, one variant in which the distance is constant or one variant in which the clamping wall has a particular concavity, to trap the clamping wheel 54.1 (this is possible thanks to a clamping wheel 54.1 movable in translation—see below).

Teeth 54.11 present on the clamping wheel 54.1 (in practice the wheel comprises a circular or substantially circular section which clamps the first capsule 3 and a toothed section, preferably under the circular section) can cooperate in teeth 54.31 in the guide wall 54.3, so that the clamping wheel 54.1 rolls against the guide wall 54.3. In addition, thanks to the teeth 54.11, 54.31, the clamping wheel 54.1 has a rolling motion without sliding against the guide wall 54.3, which allows avoiding the sliding that would risk wrongly clamping the outlet passage 3.5. Finally, thanks to the teeth 54.11, 54.31, the distance between the clamping wheel 54.1 (except the teeth, i.e. the average distance) and the guide wall 54.3 can be reduced to become almost zero under the first capsule 3 while keeping a rolling motion against the guide wall 54.3.

To authorize this kinematics, the clamping wheel 54.1 is mounted, preferably movably mounted in rotation, on an arm 54.5, which is itself movable in rotation about an arm axis of rotation 54.51.

The arm 54.5 is secured to a pinion (or a pulley), or to a pinion section 54.52, which is itself linked by various pinion or pulley to the common pinion 40.1. Consequently, the arm 54.5 is driven in rotation by the same auxiliary motor 40.

In order to ensure a pinching in the clamping position, including when the auxiliary motor 40 is no longer powered-on, the clamping wheel 54.1 is movably mounted in translation radially along the arm 54.5. Return means 54.4 disposed between the clamping wheel 54.1 and the arm 54.5 tend to move the clamping wheel 54.1 apart from the arm axis of rotation 54.51 and therefore to press the clamping wheel 54.1 against the guide wall 54.3. More specifically, an intermediate support, which carries the axis of rotation 54.2 of the clamping wheel 54.1 is provided. It is this intermediate support that is movable in translation relative to the shaft 54.5.

A slide connection with a pin 54.42 in the intermediate support which slides in a groove 54.53 of the shaft 54.5 allows guiding the translation and also, advantageously, limiting the translational motion.

The return means 54.4 therefore operate in compression, insofar as by default they are not compressed (or little). A helical spring, a leaf spring, or other types of springs may be suitable. Due to the return means 54.4, the clamping wheel 54.1 can remain pressed against the guide wall 54.3 even though the distance between the guide wall 54.3 and the arm axis of rotation 54.51 is variable (it can gradually decrease towards the area where the outlet passage is located 3.5).

The Common Drive

Preferably, the retention mechanism 50, the coupling mechanism 52 and the clamping mechanism 54 are driven concomitantly, by a common drive, as described according to the exemplary embodiment below.

The retention mechanism 50 is driven by a pinion 51, linked to at least another pinion 51.1 (FIGS. 10A, 10B).

The coupling mechanism 52 is driven by a pinion, linked to at least another pinion, which are preferably the pinion 51 and the other pinion 51.1 (FIGS. 10A, 10B).

The clamping mechanism 54 is driven by a pinion section 54.52.

Different kinematic chains can be provided but a common pinion 40.1 is preferably provided, which then drives the other pinion 51.1 and the pinion section 54.52.

As illustrated in FIGS. 11A, 11B, 11C, the common pinion 40.1 is located on the output shaft of the auxiliary motor 40. It directly meshes the pinion 51.1 which is mounted on a shaft comprising another pinion 51.2. This pinion 51.2 for its part meshes the pinion section 54.52. The kinematic chain is thus very simple, with a minimum of pinions, and therefore a minimum of friction losses, a minimum risk of breakage, and with little clearance.

Thanks to this common pinion 40.1, located on the output shaft of the auxiliary motor 40, at least two of the three aforementioned mechanisms 50, 52, 54 are simultaneously in the insertion position or in the retention, coupling and clamping position, respectively. The same auxiliary motor 40 therefore drives all three, which constitutes a major simplification of the mixing machine 6 and of its operating logic.

Visual and Audio Display

The mixing machine 6 advantageously comprises a screen 60 and/or a loudspeaker, which allow exchanging information with the user (FIGS. 1A, 1B, 7).

The screen 60 is preferably a touchscreen, to avoid providing physical buttons. It allows the user to indicate the launching of the cycle and the time of withdrawal.

The screen 60 can also display the end of the cycle, for example by being accompanied by an audible warning.

Power Supply and Monitoring Unit

According to one embodiment of the invention, the mixing machine 6 also includes an electric power source (not represented in the figures) configured to electrically supply the mixing machine 6, and in particular the drive motor 39 and the auxiliary motor 40. The electric power source advantageously or even exclusively includes at least one rechargeable battery 44 (FIG. 7B). In the example illustrated, the rechargeable battery 44 is advantageously constituted by a two-cell lithium-ion battery providing a nominal output voltage of 7.4 V.

As illustrated in FIG. 12, the mixing machine 6 further includes a monitoring unit 45, comprising for example a controller such as a microcontroller or a processor 45.1 such as a microprocessor, configured to monitor the operation of the manufacturing apparatus 2, and more particularly of the drive motor 39, of the auxiliary motor 40, of the heating element 46, of the temperature sensor(s) and of the screen 60 (for the latter, a processor is favored), as well as any audio or visual device. The monitoring unit 45 advantageously comprises a memory 45.2, of non-volatile type, which stores the instruction lines in the form of a program to be executed by the controller or the processor 45.1, in particular to implement some steps described in the method below.

OTHER EMBODIMENTS

In one variant, the receiving device 5 is integrated into the mixing machine 6. Consequently, it suffices to insert the first or second capsule 3, 4 into the first or second receiving location 13, 14. A receiving housing 32, which corresponds to the volume occupied by the receiving device 5 is defined.

In addition, in this variant, the actuation faces 8.1, 9.1 may not be present: the actuation members 37, 38 in this case press directly the first or second capsule 3, 4.

Use Method

At least one method for manufacturing a composition, such as a cosmetic product, using the manufacturing apparatus 2 will now be described. This manufacturing method can be composed of several sub-methods (called "methods" for the sake of clarity), one or more variants of which will be described. A preliminary method Ep, an initialization method Ei, a mixing method Em, then a withdrawal method Er are particularly distinguished.

Particularly, these methods (or their variants) are advantageously implemented using the different embodiments of the manufacturing apparatus 2 described above. Preferably, most of the steps of the methods Ei, Em and Er are stored in the memory 45.2, of non-volatile type, in the form of instructions in lines of codes able to be executed by the processor 45.1.

A preliminary method Ep comprises a preliminary step Ep1 to any use of the manufacturing apparatus 2 which consists either of plugging it into the mains or of recharging the battery 44. In addition, this preliminary step Ep1 can be preceded or followed by a step Ep2 of positioning the manufacturing apparatus 2 on a flat support, possibly with a power-on step.

Then, an initialization method Ei is implemented. In a step Ei1 ("receiving step"), the processor of the manufacturing machine 2 receives a starting instruction. This starting instruction is typically generated by an action of a user (contact with the touchscreen 60, push button, switch, etc.).

Following this step Ei1, in a step Ei2 ("verification step"), the method ensures that the actuation system 35 is in the neutral position, allowing the insertion of the receiving device 5 or the insertion of the first and second capsules 3, 4. Typically, it must be ensured that the receiving housing 32 (for the insertion of the receiving device 5) or the first or second receiving location 13, 14 (for the insertion of the first or second capsule 3, 4 when there is no receiving device 5) are not obstructed by the actuation system 35. During this step Ei2, it should also be verified that the clamping mechanism 54, the coupling mechanism 52 and the retention mechanism 50 are deactivated, i.e. in their respective insertion position.

Following this step Ei2, it is possible to manually insert the receiving device 5 containing the first or second capsule 3, 4, or even directly insert the first or second capsule 3, 4, into the receiving housing 32.

Finally, in a following step Ei3 ("closing step"), at least one of: the clamping mechanism 54, the coupling mechanism 52, the retention mechanism 50 are activated, i.e. they are moving. This step Ei3 consists for example of an instruction by the processor intended for the auxiliary motor 40 to trigger it, so that it drives the three aforementioned mechanisms in case they are all linked to the common pinion (or pulley) 40.1. The auxiliary motor 40 switches from a first position to a second position, so that the clamping mechanism 52, the coupling mechanism 54 and the retention mechanism 50 switch from their respective insertion position to their respective clamping, coupling and retention positions. Preferably, the auxiliary motor 40 maintains the second position at the end of step Ei3, even though it is no longer powered.

Steps Ei1, Ei2 and Ei3 are executed in particular by the processor 45.1.

At the end of this initialization method Ei, the mixing machine 6 is ready to start work on the first and second capsules 3, 4: it is the object of the mixing Er and withdrawal Em methods.

The mixing method Em comprises a first preparation phase step Em1 ("primary step of setting in motion the actuation system"), during which the link weld of the capsule positioned furthest from the is heater element 46 is broken (the second capsule 4 in the figures), and this capsule is compressed so that its content is sent partly towards the capsule closest to the heater element 46. According to the exemplary embodiment presented, the second actuation member 38 is set in motion to break the link weld in the second capsule 4 (which comprises for example the fatty phase formulation). In this way, part of the content of the second capsule 4 is sent on the side of the first capsule 3, particularly in the link passage 3.3 (because the link weld of the first capsule 3 has not yet broken). The second actuation member 38 is preferably set in motion along its actuation stroke C38. For the sake of simplified design, there is not necessarily a partial stroke sensor for the second actuation member 38.

In a preparation phase step Em2 ("secondary step of setting in motion the actuation system" or "pre-stressing step"), the first actuation member 37 is set in motion along a partial stroke strictly lower than its actuation stroke C37 and keeps its position, in order to exert a pre-stress on the first capsule 3 (which comprises for example the aqueous phase formulation) such that the planar face 3.7 is pressed against the diffusion plate 46.2. This pre-stress allows promoting the heat exchange between the diffusion plate 46.2 and the first capsule 3 during a subsequent step Em3 ("heating step"). It should be noted that this pressurization of the first capsule 3 against the diffusion plate 46.2, thanks to the setting in motion of the first actuation member 37 over a partial stroke, is achieved without causing the failure of the link weld in the first capsule 3 (which would cause the sending of the formulation from the first capsule 3 to the second capsule 4).

In the preparation phase step Em3 ("heating step"), the heater element 46 is activated to generate heat intended for the first capsule 3. As the heater element 46 is positioned on the side of the planar face. 3.7 of the first capsule 3, and the pre-stressing step has allowed good thermal contact between the diffusion plate 46.2 and the first capsule 3, the heat provided by the heater element 46 is well distributed over the content of the first capsule 3. Step Em3 is therefore activated in the absence of any motion of the actuation members 37, 38. Such a step of heating without kneading is particularly advantageous in that it allows not degrading the quality of the formulations. A kneading during this heating step would particularly risk degrading the properties of the emulsion obtained by mixing the formulations.

During the preparation phase step Em3, the temperature of the heater element 46 reaches a target temperature Tc comprised between 80° C. and 90° C. The objective of this target temperature Tc is that the content of the first capsule 3 reaches a target temperature Tc' also comprised between 80° C. and 90° C. and preferably on the order of 85° C. Indeed, it was found that the temperature of the content of the first capsule 3 during this heating step Em3 corresponded substantially to the target temperature Tc of the heater element 46, however with a slight time offset.

Then, in a kneading phase step Em3' ("mixing step"), the heater element 46 is deactivated and then the first actuation member 37 is set in motion along its nominal stroke to break the link weld in the first capsule 3. Cutting off the power supply to the heater element 46 prior to the activation of the first actuation member 37 allows having all of the power provided by the power supply source available to supply the drive motor 39. Such a characteristic is particularly advantageous in the case where the mixing machine 6 is supplied by a power transformer or a low-power battery 44. Indeed, it allows preventing the power provided to the drive motor 39 from being insufficient to allow the failure of the link weld of the first capsule 3 (which would then lead to a blockage of the apparatus), this link weld failure step requiring high motor torque. When the first actuation member 37 reaches its end of actuation stroke C37, the content of the first capsule 3 is sent to second capsule 4 and the two formulations can then circulate freely from a first or second capsule 3, 4 to the other second or first capsule 4, 3 via the connection portions 3.2, 4.2 on each back-and-forth motion of the actuation system 35, the link welds originally present in each of the first and second capsules 3, 4 having been broken.

Subsequently, steps Em4, Em5, Em6 are successive kneading steps, with or without heating (this is referred to as kneading phase).

The kneading phase step Em4 ("step of kneading without heating") consists in setting in motion the actuation members 37, 38 in a back-and-forth without activation of the heater element 46, i.e. without heating. During this step, the first and second capsules 3, 4 are deformed at least once each. According to one embodiment, step Em4 lasts at least 1.4 s and preferably between 2 s and 4 s. Such a step of kneading without heating allows launching the drive motor 39 at a constant speed while benefiting from the full power of the electric power source.

Steps Em1, Em2 and Em3, Em3', Em4 alternate between setting in motion of the actuation system 35 and heating with the heater element 46. This concretely results in a power supply dedicated either to the actuation system 35 or to the heater element 46. This exclusive alternation allows preserving the battery 44 by distributing the moments of high power. Indeed, the engagement of the setting in motion generates a significant resisting torque which imposes a significant motor torque and the temperature rise also requires a significant power: the battery 44 is then highly loaded. This alternation solution also allows reducing the size of components, which is a design constraint during the creation of a portable and battery-powered mixing machine.

On the other hand, once the temperature is close to the target temperature Tc' and once the actuation system 35 is already in motion, the loads on the battery 44 are reduced and authorize a supply to the heater element 46 and to the actuation system 35 in parallel: this is the object of step Em5.

During the kneading phase step Em5 ("step of kneading with heating"), the actuation system 35 remains activated and the heater element 46 is reactivated in order to maintain the mixture of the formulations at a temperature which is preferably the target temperature Tc'. Consequently, the heater element is maintained at the target temperature Tc. This step Em5 lasts for example between 5 s and 30 s, preferably between 7 s and 15 s. Although the battery 44 is less loaded than for an engagement on or for a temperature rise, it may have a tendency to be rapidly discharged in this phase which is therefore limited in duration.

However, this step Em5 is sufficiently long for the first and second capsules 3, 4 to be deformed several times each and for the emulsion obtained by mixing the formulations to be satisfactory.

Between step Em4 and Em5, the actuation system 35 has not been interrupted.

Thereafter, the kneading phase step Em6 ("step of cooling with kneading") is implemented. Alternatively, this step is done without kneading but it is preferable to keep the actuation system 35 activated in order to improve or maintain the homogenization of the formulations. During step Em6, the temperature of the cream decreases down to a withdrawal temperature Tr' comprised between 35° C. and 48° C., preferably 38° C. and 42° C. In the case of the embodiment presented, the withdrawal temperature Tr' of the cream corresponds to a withdrawal temperature Tr of the heater element 46 comprised between 55° C. and 60° C. This temperature deviation between the content of the first and second capsules 3, 4 and the temperature of the heater element 46 during the cooling step is explained in particular by the fact that, during the kneading, the composition is present only part of the time in the first capsule 3 and therefore facing the diffusion plate 46.2 at the level of which the temperature measurement is made.

The simplest cooling technique is to stop the supply to the heater element 46 and allow the cream to cool with room temperature air. Consequently, the duration of step Em6 effectively depends on the room temperature. In this regard, a temperature sensor is advantageously positioned in the mixing machine 6, and more specifically in the receiving device 5. In order to limit the number of temperature sensors, it is the same sensor that measures the temperature of heater element 46.

As in the illustrated embodiment, the temperature sensor measures the temperature of the heater element 46, the same sensor is reused: this means that the end of step Em6 is determined by the temperature measured by said sensor, i.e. the withdrawal temperature Tr' comprised between 55° C. and 60° C.

Once the withdrawal temperature is reached, the actuation system 35 is stopped.

The cooling step Em6 generally lasts at least 20 s and preferably 40 s.

In one variant, step Em6 could also advantageously comprise a minimum kneading duration, for example on the order of 40 s, allowing guaranteeing a good emulsion, then an additional kneading duration which only occurs when the withdrawal temperature Tr' has not yet been reached. In other words, kneading is still made for a certain period of time even if the temperature is lower than the withdrawal temperature Tr'.

It should be noted that the mixing machine 6 could according to one embodiment, not illustrated, comprise a cooling system for actively cooling the cream and accelerating the process. For example, a cooling system could be provided equipped with a small-sized fan in addition or not to a cooling element, the fan forcing air circulation in the mixing machine 6, and therefore a forced convection cooling.

Once the mixing method Em is completed, the withdrawal method Er can be engaged. This withdrawal method Er will now be described.

As the previous steps take some time (usually more than a minute), it is likely that the user does not stay near the mixing machine 6 but goes about his usual activities (breakfast, radio, television, bread buttering, dressing, ironing, etc.). Thus, it is important that the mixing machine 6 can keep the cream in a ready-to-use state for a determined period of time.

To this end, in a step Er1 ("step of transferring for storage"), the actuation system 35 is activated once to transfer the cream into the capsule which is located on the side of the heater element 46 (i.e. the first capsule 3 here). This step is optional if step Em6 has already stopped in the right configuration.

In a step Er2 ("pre-stress holding step"), the actuation system 35 is returned to the pre-stressed position, where the first actuation member 37 exerts a pre-stress on the first capsule 3 to press it against the diffusion plate 46.2, then, in a step Er3 ("maintenance temperature step"), the heater element 46 is reactivated to keep the cream at the withdrawal temperature Tr'. The pre-stress holding step Er2 allows better heat conduction, like step Em2. Preferably, a kneading or motion of the actuation system 35 is implemented periodically during step Er3 to guarantee a good emulsion, the latter possibly being partly deteriorated by the presence of hot spots on the diffusion plate 46.2.

In one variant, the withdrawal method may include, instead of step Er2, a step Er2' ("neutral position holding step") in which the actuation system 35 is activated to be placed in a neutral position, i.e. without stressing the first or second capsule 3, 4, and particularly without stressing the first capsule 3 against the heater element 46. Surprisingly, such a variant allows maintaining a better emulsion and avoids having to resort to periodic kneading during the warm keeping phase.

Step Er3 is implemented for a predetermined waiting time. This duration is less than 15 min, so as not to supply the heater element 46 for too long, but greater than 1 min, to allow the user to have flexibility in the time management in the morning, and preferably on the order of 5 min.

In other words, this means that the user has between 1 min and 15 min and preferably on the order of 5 min (depending on the factory settings or on the user settings) after the end of the motion of the actuation system 35 to collect the cream at the right temperature.

Once the user is ready to use the cream, he touches the touchscreen or presses a button, which triggers a step Er4 ("step of receiving withdrawal instructions"), during which the mixing machine 6 receives a withdrawal instruction.

Then, in a step Er5 ("step of setting in neutral position"), the actuation system 35 is activated to be set in the neutral position.

In case the actuation system 35 was pre-stressed beforehand at the level of the first actuation member 37, the latter must complete its motion, which moves the formulation in the second capsule 4, then the actuation system 35 stops in a neutral position which corresponds to a position adapted to extract the receiving device 5. This position also corresponds to a starting position adapted to achieve a next manufacturing cycle implementing the method described above. Indeed, the second actuation member 38 is then ready to compress the second capsule 4 during step Em1 as soon as the drive motor 39 is started.

In the case of the variant where the actuation system 35 has been set in neutral position during the temperature maintenance step Er2' of step Er3, it may be necessary that the actuation system 35 has to perform a back-and-forth to be positioned in the neutral position adapted to achieve a next manufacturing cycle implementing the method described above, i.e. with the second actuation member 38 ready to compress the second capsule 4 during step Em1.

During this back-and-forth of the actuation system 35, the cream present in the first capsule 3 is partially sent in the second capsule.

Finally, in a last step Er6 ("unlocking step"), each mechanism activated in step Ei3 is placed in the insertion position. Likewise, this step Er6 involves an activation of the auxiliary motor 40.

Subsequently, the user grabs the receiving device 5 and withdraws it from its receiving housing 32. Then he presses the actuation faces 8.1, 9.1 to pivot the vanes in order to expel the cream present in the first and second capsules 3, 4 via the outlet passage 3.5 of the first capsule 3. Finally, it suffices to withdraw the first or second capsules 3, 4 from the receiving device 5 so that the latter is again ready for use. Indeed, no part of the mixing machine 6 (manufacturing apparatus 2 or receiving device) has been in contact with the formulations.

As emerging from the description above, all or part of the steps of implementing the method are controlled relative to a reference temperature. This reference temperature is generally monitored using the temperature sensors described above which allow determining the temperature prevailing within the capsules. It could also be envisaged, in particular for basic formulations of which all the characteristics are known beforehand and specific compositions to be achieved, to have timed cycles, i.e. where only the cycle times are followed, instead of following temperature evolutions.

The different steps of implementing the method described above, which can for example be implemented successively, are therefore as follows:

Ei1: step of receiving a starting instruction (implemented by the mixing machine and more specifically by the processor), Ei2: step of positioning the actuation system (implemented by the mixing machine and more specifically by the processor that controls the drive motor), Ei3: step of closing, preferably in parallel, the clamping, retention and coupling mechanisms (implemented by the mixing machine and more specifically by the processor that controls the auxiliary motor), Em1: primary step of setting in motion the actuation system to break the link weld of one of the capsules (implemented by the mixing machine and more specifically by the processor that controls the drive motor), Em2: secondary step of setting in motion the actuation system to exert a pre-stress on the other capsule (implemented by the mixing machine and more specifically by the processor that controls the drive motor), Em3: step of heating the pre-stressed capsule, (implemented by the mixing machine and more specifically by the processor that controls the heater element), Em3': step of mixing by setting in motion the actuation system to break the link weld of the other capsule and allow a free circulation of the formulations from one capsule to another (implemented by the mixing machine and more specifically by the processor that controls the drive motor), Em4: step of kneading without heating to launch the motor at constant speed (implemented by the mixing machine and more specifically by the processor that controls the drive motor), Em5: step of kneading with heating to achieve the emulsion (implemented by the mixing machine and more specifically by the processor that controls the drive motor and the heater element), Em6: step of cooling with kneading and without heating (cooling) up to the withdrawal temperature (implemented by the mixing machine including the processor that controls the drive motor), Er1: optional step of transferring for storage with setting in motion of the actuation system (implemented by the mixing machine and more specifically by the processor that controls the drive motor), Er2: step of setting in a pre-stressed position the actuation system (implemented by the mixing machine and more specifically by the processor), Er2': step (alternative to step Er2) of setting in a neutral position the actuation system (implemented by the mixing machine and more specifically by the processor that controls the drive motor), Er3: temperature maintenance step (implemented by the mixing machine and more specifically by the processor), Er4: step of receiving a withdrawal instruction (implemented by the mixing machine and more specifically by the processor), Er5: step of setting in neutral position the actuation system (implemented by the mixing machine and more specifically by the processor that controls the drive motor)

Er6: unlocking step (implemented by the mixing machine and more specifically by the processor that controls the auxiliary motor).

The invention claimed is:

1. A mixing method using a manufacturing apparatus comprising a mixing machine comprising a support defining a receiving housing which defines an insertion aperture, and a receiving device removably disposed within the insertion aperture of the receiving housing, the receiving device comprising a first receiving location configured to receive a first deformable capsule and a second receiving location configured to receive a second deformable capsule, the first and second capsules being intended to be fluidly linked to each other and containing respectively a first formulation and a second formulation, the manufacturing apparatus comprising an actuation system configured to transmit a pressure force to the first and second capsules in order to move the content of the first capsule in the second capsule, and vice versa, the mixing machine comprising a heater element configured to heat at least one of the first and second capsules when the first and second capsules are received in the mixing machine, the method comprising the following steps:

heating with the heater element up to a target temperature;

kneading by setting in motion the actuation system; and cooling with kneading by setting in motion of the actuation system up to a withdrawal temperature from which the kneading is stopped.

2. The method of claim 1, wherein the cooling step is implemented for a predetermined period of time.

3. The method of claim 1, wherein the withdrawal temperature corresponds to a temperature of the heater element comprised between 55° C. and 60° C.

4. The method of claim 1, wherein the target temperature is greater than the withdrawal temperature by at least 20° C.

5. The method of claim 1, wherein after the heating step has been initiated, the kneading step is performed with heating with the actuation system in order to maintain the target temperature.

6. The method of claim 5, wherein the kneading step comprises a step of kneading without heating, by the actuation system between the heating step and the step of kneading with heating.

7. The method of claim 1, wherein the cooling step is followed by at least one step of a withdrawal method during which the actuation system can be actuated to be brought into a neutral position.

8. The method of claim 1, wherein the cooling step is implemented for a predetermined period of time of at least 20 s.

9. The method of claim 1, wherein the cooling step is implemented for a predetermined period of time of at least 30 s.

10. The method of claim 1, wherein the withdrawal temperature corresponds to a temperature such that the temperature of the content of the first capsule and/or of the second capsule is comprised between 35° C. and 50° C.

11. The method of claim 1, wherein the withdrawal temperature corresponds to a temperature such that the temperature of the content of the first capsule and/or of the second capsule is comprised between 38° C. and 42° C.

12. A manufacturing apparatus for the manufacture of a composition, comprising a mixing machine comprising a support defining a receiving housing which defines an insertion aperture, and a receiving device removably disposed within the insertion aperture of the receiving housing, the receiving device comprising a first receiving location configured to receive a first deformable capsule and a second receiving location configured to receive a second deformable capsule, the first and second capsules being intended to be fluidly linked to each other and containing respectively a first formulation and a second formulation, the mixing machine comprising at least one actuation system configured to transmit a pressure force to the first and second capsules in order to move the content of the first capsule in the second capsule, and vice versa, the manufacturing apparatus comprising a heater element configured to heat at least one of the first and second capsules when the first and second capsules are received in the mixing machine, wherein the manufacturing apparatus is configured to implement the following steps:

heating with the heater element up to a target temperature;

kneading by setting in motion the actuation system; and cooling with kneading by setting in motion of the actuation system up to a withdrawal temperature from which the kneading is stopped.

13. The method of claim 12, wherein the manufacturing apparatus comprises a temperature sensor electrically connected to the mixing machine and used for controlling the mixing machine.

14. The method of claim 13, wherein control of the actuation system is determined by a measurement of the temperature sensor.

15. The method of claim 13, wherein the temperature sensor is configured to measure a temperature of the heating element.

16. The method of claim 13, wherein the actuation system is configured to be stopped when the withdrawal temperature is detected by the temperature sensor.

* * * * *